United States Patent
McKissick et al.

(10) Patent No.: US 9,226,012 B2
(45) Date of Patent: Dec. 29, 2015

(54) SYSTEMS AND METHODS FOR PROVIDING A PROGRAM AS A GIFT USING AN INTERACTIVE APPLICATION

(71) Applicant: Rovi Guides, Inc., Santa Clara, CA (US)

(72) Inventors: Pamela L. McKissick, Tulsa, OK (US); William L. Thomas, Evergreen, PA (US); Michael D. Ellis, Boulder, CO (US); Mark A. Regouby, Tulsa, OK (US); Joel G. Hassell, Arvada, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/847,775

(22) Filed: Mar. 20, 2013

(65) Prior Publication Data

US 2013/0290992 A1     Oct. 31, 2013

Related U.S. Application Data

(63) Continuation of application No. 11/408,747, filed on Apr. 21, 2006, now abandoned, which is a continuation of application No. 09/356,245, filed on Jul. 16, 1999, now abandoned.

(60) Provisional application No. 60/099,301, filed on Aug. 26, 1998.

(51) Int. Cl.
*H04N 7/173*     (2011.01)
*G06F 13/30*     (2006.01)
(Continued)

(52) U.S. Cl.
CPC .......... *H04N 21/2543* (2013.01); *G06Q 30/02* (2013.01); *G06Q 30/0601* (2013.01);
(Continued)

(58) Field of Classification Search
CPC .......... H04N 21/472; H04N 21/47202; H04N 21/2543
USPC ............................................. 725/61, 8, 25, 5
See application file for complete search history.

(56) References Cited

U.S. PATENT DOCUMENTS

| | | | |
|---|---|---|---|
| 4,331,974 | A | 5/1982 | Cogswell et al. |
| 4,536,791 | A | 8/1985 | Campbell et al. |

(Continued)

FOREIGN PATENT DOCUMENTS

| | | |
|---|---|---|
| EP | 0263635 | 4/1988 |
| EP | 0382764 | 8/1990 |

(Continued)

OTHER PUBLICATIONS

"Excite@Home Sets Voice Offerings," Broadband Week, p. 45 (Jul. 5, 1999).

(Continued)

*Primary Examiner* — Pankaj Kumar
*Assistant Examiner* — Reuben M Brown
(74) *Attorney, Agent, or Firm* — Ropes & Gray LLP

(57) ABSTRACT

A television message system is provided that allows users at user television equipment devices that are connected to a television distribution facility to transmit messages to each other relating to a television program or other suitable subject. The television message system permits users to participate in evaluations, contests, promotions, and surveys related to a television program while watching that television program. The television message system also permits users to compose and send a message to a television program entity. Users can send messages through the television message system to users at personal computers who are connected to the user's television distribution facility through a communications network. The television message system also allows a user to purchase a gift related to television programming for a recipient. The gift may be an electronic gift certificate for pay-per-view programming.

20 Claims, 31 Drawing Sheets

(51) Int. Cl.

| | | |
|---|---|---|
| H04N 21/2543 | (2011.01) | |
| G06Q 30/02 | (2012.01) | |
| G06Q 30/06 | (2012.01) | |
| H04N 7/14 | (2006.01) | |
| H04N 21/24 | (2011.01) | |
| H04N 21/25 | (2011.01) | |
| H04N 21/258 | (2011.01) | |
| H04N 21/2665 | (2011.01) | |
| H04N 21/422 | (2011.01) | |
| H04N 21/431 | (2011.01) | |
| H04N 21/442 | (2011.01) | |
| H04N 21/45 | (2011.01) | |
| H04N 21/454 | (2011.01) | |
| H04N 21/462 | (2011.01) | |
| H04N 21/475 | (2011.01) | |
| H04N 21/478 | (2011.01) | |
| H04N 21/4782 | (2011.01) | |
| H04N 21/4786 | (2011.01) | |
| H04N 21/4788 | (2011.01) | |
| H04N 21/658 | (2011.01) | |
| H04N 21/81 | (2011.01) | |
| H04N 21/84 | (2011.01) | |
| H04N 5/445 | (2011.01) | |

(52) U.S. Cl.
CPC ........... *H04N7/147* (2013.01); *H04N 7/17309* (2013.01); *H04N 7/17318* (2013.01); *H04N 21/2408* (2013.01); *H04N 21/252* (2013.01); *H04N 21/25866* (2013.01); *H04N 21/2665* (2013.01); *H04N 21/42204* (2013.01); *H04N 21/4316* (2013.01); *H04N 21/44204* (2013.01); *H04N 21/44222* (2013.01); *H04N 21/454* (2013.01); *H04N 21/4532* (2013.01); *H04N 21/4622* (2013.01); *H04N 21/4751* (2013.01); *H04N 21/4753* (2013.01); *H04N 21/4755* (2013.01); *H04N 21/4756* (2013.01); *H04N 21/4758* (2013.01); *H04N 21/4781* (2013.01); *H04N 21/4782* (2013.01); *H04N 21/4786* (2013.01); *H04N 21/4788* (2013.01); *H04N 21/47815* (2013.01); *H04N 21/6582* (2013.01); *H04N 21/812* (2013.01); *H04N 21/84* (2013.01)

(56) References Cited

U.S. PATENT DOCUMENTS

| | | | |
|---|---|---|---|
| 4,694,490 | A | 9/1987 | Harvey et al. |
| 4,704,725 | A | 11/1987 | Harvey et al. |
| 4,890,321 | A | 12/1989 | Seth-Smith et al. |
| 4,965,825 | A | 10/1990 | Harvey et al. |
| 5,014,125 | A | 5/1991 | Pocock et al. |
| 5,099,319 | A | 3/1992 | Esch et al. |
| 5,109,414 | A | 4/1992 | Harvey et al. |
| 5,132,992 | A | 7/1992 | Yurt et al. |
| 5,151,789 | A | 9/1992 | Young |
| 5,155,591 | A | 10/1992 | Wachob |
| 5,212,553 | A | 5/1993 | Maruoka et al. |
| 5,223,924 | A | 6/1993 | Strubbe |
| 5,227,874 | A | 7/1993 | Von Kohorn |
| 5,233,654 | A | 8/1993 | Harvey et al. |
| 5,253,066 | A | 10/1993 | Vogel |
| 5,273,437 | A | 12/1993 | Caldwell et al. |
| 5,335,277 | A | 8/1994 | Harvey et al. |
| 5,351,075 | A | 9/1994 | Herz et al. |
| 5,353,121 | A | 10/1994 | Young et al. |
| 5,357,276 | A | 10/1994 | Banker et al. |
| 5,374,951 | A | 12/1994 | Welsh |
| 5,404,393 | A | 4/1995 | Remillard |
| 5,410,344 | A | 4/1995 | Graves |
| 5,446,919 | A | 8/1995 | Wilkins |
| 5,452,012 | A | 9/1995 | Saitoh |
| 5,483,278 | A | 1/1996 | Strubbe et al. |
| 5,485,197 | A | 1/1996 | Hoarty |
| 5,488,409 | A | 1/1996 | Yuen et al. |
| 5,515,098 | A | 5/1996 | Caries |
| 5,519,433 | A | 5/1996 | Lappington et al. |
| 5,534,911 | A | 7/1996 | Levitan |
| 5,539,822 | A | 7/1996 | Lett |
| 5,557,721 | A | 9/1996 | Fite et al. |
| 5,559,548 | A | 9/1996 | Davis et al. |
| 5,559,549 | A | 9/1996 | Hendricks et al. |
| 5,559,550 | A | 9/1996 | Mankovitz |
| 5,561,708 | A | 10/1996 | Remillard |
| 5,561,709 | A | 10/1996 | Remillard |
| 5,574,962 | A | 11/1996 | Fardeau et al. |
| 5,583,560 | A | 12/1996 | Florin et al. |
| 5,583,927 | A | 12/1996 | Ely et al. |
| 5,585,838 | A | 12/1996 | Lawler et al. |
| 5,585,866 | A | 12/1996 | Miller et al. |
| 5,589,892 | A | 12/1996 | Knee et al. |
| 5,592,509 | A | 1/1997 | McClear et al. |
| 5,594,509 | A | 1/1997 | Florin et al. |
| 5,600,364 | A | 2/1997 | Hendricks et al. |
| 5,600,573 | A | 2/1997 | Hendricks et al. |
| 5,610,653 | A | 3/1997 | Abecassis |
| 5,621,456 | A | 4/1997 | Florin et al. |
| 5,623,613 | A | 4/1997 | Rowe et al. |
| 5,629,733 | A | 5/1997 | Youman et al. |
| 5,635,978 | A | 6/1997 | Alten et al. |
| 5,636,346 | A | 6/1997 | Saxe |
| 5,657,072 | A | 8/1997 | Aristides et al. |
| 5,657,091 | A | 8/1997 | Bertram |
| 5,659,350 | A | 8/1997 | Hendricks et al. |
| 5,666,645 | A | 9/1997 | Thomas et al. |
| 5,682,195 | A | 10/1997 | Hendricks et al. |
| 5,687,331 | A | 11/1997 | Volk et al. |
| 5,694,163 | A | 12/1997 | Harrison |
| 5,724,521 | A | 3/1998 | Dedrick |
| 5,732,216 | A | 3/1998 | Logan et al. |
| 5,734,853 | A | 3/1998 | Hendricks et al. |
| 5,740,549 | A | 4/1998 | Reilly et al. |
| 5,754,843 | A | 5/1998 | Imanaka et al. |
| 5,754,939 | A | 5/1998 | Herz et al. |
| 5,758,257 | A | 5/1998 | Herz et al. |
| 5,760,821 | A | 6/1998 | Ellis et al. |
| 5,774,170 | A | 6/1998 | Hite et al. |
| 5,781,226 | A | 7/1998 | Sheehan |
| 5,781,246 | A | 7/1998 | Alten |
| 5,796,393 | A | 8/1998 | MacNaughton et al. |
| 5,798,785 | A | 8/1998 | Hendricks et al. |
| 5,801,785 | A | 9/1998 | Crump et al. |
| 5,805,154 | A | 9/1998 | Brown |
| 5,805,763 | A | 9/1998 | Lawler et al. |
| 5,808,694 | A | 9/1998 | Usui et al. |
| 5,812,123 | A | 9/1998 | Rowe et al. |
| 5,819,156 | A | 10/1998 | Belmont |
| 5,822,123 | A | 10/1998 | Davis et al. |
| 5,822,677 | A | 10/1998 | Peyrovian |
| 5,828,420 | A | 10/1998 | Marshall et al. |
| 5,828,839 | A | 10/1998 | Moncreiff |
| 5,830,068 | A | 11/1998 | Brenner et al. |
| 5,833,468 | A | 11/1998 | Guy et al. |
| 5,838,314 | A | 11/1998 | Neel et al. |
| 5,841,468 | A | 11/1998 | Wright |
| 5,842,199 | A | 11/1998 | Miller et al. |
| 5,844,620 | A | 12/1998 | Coleman et al. |
| 5,845,260 | A | 12/1998 | Nakano et al. |
| 5,848,396 | A | 12/1998 | Gerace |
| 5,850,218 | A | 12/1998 | LaJoie et al. |
| 5,872,588 | A | 2/1999 | Aras et al. |
| 5,886,691 | A | 3/1999 | Furuya et al. |
| 5,886,731 | A | 3/1999 | Ebisawa |
| 5,887,243 | A | 3/1999 | Harvey et al. |
| 5,900,905 | A | 5/1999 | Shoff et al. |
| 5,907,323 | A | 5/1999 | Lawler et al. |
| 5,931,905 | A | 8/1999 | Hashimoto et al. |
| 5,940,073 | A | 8/1999 | Klosterman et al. |
| 5,945,988 | A | 8/1999 | Williams et al. |

(56) References Cited

U.S. PATENT DOCUMENTS

| | | |
|---|---|---|
| 5,956,693 A | 9/1999 | Geerlings |
| 5,974,222 A | 10/1999 | Yuen et al. |
| 5,977,964 A | 11/1999 | Williams et al. |
| 5,990,927 A | 11/1999 | Hendricks et al. |
| 5,991,799 A | 11/1999 | Yen et al. |
| 6,002,393 A | 12/1999 | Hite et al. |
| 6,002,394 A | 12/1999 | Schein et al. |
| 6,005,597 A | 12/1999 | Barrett et al. |
| 6,006,257 A | 12/1999 | Slezak |
| 6,014,502 A | 1/2000 | Moreas |
| 6,018,372 A | 1/2000 | Etheredge |
| 6,020,929 A | 2/2000 | Marshall et al. |
| 6,025,886 A | 2/2000 | Koda |
| 6,029,045 A | 2/2000 | Picco et al. |
| 6,047,265 A | 4/2000 | Sugimori |
| 6,052,145 A | 4/2000 | Macrae et al. |
| 6,064,376 A | 5/2000 | Berezowski et al. |
| 6,078,348 A | 6/2000 | Klosterman et al. |
| 6,081,830 A | 6/2000 | Schindler |
| 6,091,883 A | 7/2000 | Artigalas et al. |
| 6,111,614 A | 8/2000 | Mugura et al. |
| 6,112,186 A | 8/2000 | Bersh et al. |
| 6,115,057 A | 9/2000 | Kwoh et al. |
| 6,118,492 A | 9/2000 | Milnes et al. |
| 6,119,098 A | 9/2000 | Guyot et al. |
| 6,125,259 A | 9/2000 | Perlman |
| 6,151,059 A | 11/2000 | Schein et al. |
| 6,157,413 A | 12/2000 | Hanafee et al. |
| 6,160,570 A | 12/2000 | Sitnik |
| 6,163,316 A | 12/2000 | Killian |
| 6,172,677 B1 | 1/2001 | Stautner et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,240,555 B1 | 5/2001 | Shoff et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,275,268 B1 | 8/2001 | Ellis et al. |
| 6,279,157 B1 | 8/2001 | Takasu |
| 6,286,140 B1 | 9/2001 | Ivanyi |
| 6,298,482 B1 | 10/2001 | Seidman et al. |
| 6,312,336 B1 | 11/2001 | Handelman et al. |
| 6,323,911 B1 | 11/2001 | Schein et al. |
| 6,326,969 B1 | 12/2001 | Helman et al. |
| 6,331,877 B1 | 12/2001 | Bennington et al. |
| 6,339,784 B1 | 1/2002 | Morris et al. |
| 6,363,525 B1 | 3/2002 | Dougherty |
| 6,374,406 B2 | 4/2002 | Hirata |
| 6,388,714 B1 | 5/2002 | Schein et al. |
| 6,389,593 B1 | 5/2002 | Yamagishi |
| 6,392,710 B1 | 5/2002 | Gonsalves |
| 6,408,437 B1 | 6/2002 | Hendricks et al. |
| 6,412,110 B1 | 6/2002 | Schein et al. |
| 6,418,556 B1 | 7/2002 | Bennington et al. |
| 6,438,579 B1 | 8/2002 | Hosken |
| 6,453,471 B1 | 9/2002 | Klosterman |
| 6,463,585 B1 | 10/2002 | Hendricks et al. |
| 6,477,705 B1 | 11/2002 | Yuen et al. |
| 6,515,680 B1 | 2/2003 | Hendricks et al. |
| 6,564,378 B1 | 5/2003 | Satterfield et al. |
| 6,591,292 B1 | 7/2003 | Morrison et al. |
| 6,668,278 B1 | 12/2003 | Yen et al. |
| 6,672,775 B1 | 1/2004 | Narayanaswami |
| 6,750,881 B1 | 6/2004 | Appelman et al. |
| 6,757,711 B2 | 6/2004 | Toga |
| 7,006,989 B2 | 2/2006 | Bezos et al. |
| 7,047,550 B1 | 5/2006 | Yasukawa et al. |
| 7,451,470 B2 | 11/2008 | Zimmerman |
| 7,603,683 B2 | 10/2009 | Reto |
| 2001/0024565 A1 | 9/2001 | Yui et al. |
| 2002/0007309 A1 | 1/2002 | Reynar |
| 2002/0007342 A1 | 1/2002 | Sellers et al. |
| 2002/0059602 A1 | 5/2002 | Macrae et al. |
| 2002/0059606 A1 | 5/2002 | Kikinis et al. |
| 2002/0073424 A1 | 6/2002 | Ward et al. |
| 2002/0144273 A1 | 10/2002 | Reto |
| 2003/0149980 A1 | 8/2003 | Hassell et al. |
| 2004/0073947 A1 | 4/2004 | Gupta |
| 2004/0125133 A1 | 7/2004 | Pea et al. |
| 2004/0193489 A1 | 9/2004 | Boyd et al. |
| 2005/0235316 A1 | 10/2005 | Ahmad-Taylor |
| 2005/0273832 A1 | 12/2005 | Zigmond et al. |
| 2005/0289112 A1 | 12/2005 | Sargent et al. |
| 2006/0143653 A1 | 6/2006 | Suh |
| 2006/0190966 A1 | 8/2006 | McKissick et al. |
| 2006/0282856 A1 | 12/2006 | Errico et al. |
| 2007/0124795 A1 | 5/2007 | McKissick et al. |
| 2007/0186241 A1 | 8/2007 | Sugimoto et al. |
| 2008/0109308 A1 | 5/2008 | Storey |
| 2008/0126476 A1 | 5/2008 | Nicholas et al. |
| 2009/0133070 A1 | 5/2009 | Hamano et al. |
| 2011/0179129 A1 | 7/2011 | Mckissick et al. |

FOREIGN PATENT DOCUMENTS

| | | |
|---|---|---|
| EP | 0424648 | 5/1991 |
| EP | 0263635 | 11/1993 |
| EP | 0752767 | 1/1997 |
| EP | 0753964 | 1/1997 |
| EP | 0772360 | 5/1997 |
| EP | 0784405 | 7/1997 |
| EP | 0793387 | 9/1997 |
| EP | 0822718 | 2/1998 |
| EP | 0833511 | 4/1998 |
| EP | 0834798 | 4/1998 |
| EP | 0849948 | 6/1998 |
| EP | 0851681 | 7/1998 |
| EP | 1841219 | 10/2007 |
| JP | 59141878 | 8/1984 |
| JP | 61050470 | 3/1986 |
| JP | 06150470 | 5/1994 |
| JP | 09237234 | 9/1997 |
| JP | 10-164258 | 6/1998 |
| JP | 10155131 | 6/1998 |
| JP | 10164258 | 6/1998 |
| JP | 10210445 | 8/1998 |
| JP | 11-143955 | 5/1999 |
| JP | 2006-198551 | 8/2006 |
| JP | 2007-13999 | 1/2007 |
| WO | WO-8902682 | 3/1989 |
| WO | WO-9322877 | 11/1993 |
| WO | WO-9406230 | 3/1994 |
| WO | WO-9414284 | 6/1994 |
| WO | WO-9507003 | 3/1995 |
| WO | WO-9515658 A1 | 6/1995 |
| WO | WO-9532585 | 11/1995 |
| WO | WO-9608109 | 3/1996 |
| WO | WO-9608113 | 3/1996 |
| WO | WO-9609721 | 3/1996 |
| WO | WO-9625006 | 8/1996 |
| WO | WO-9626605 | 8/1996 |
| WO | WO-9634491 | 10/1996 |
| WO | WO-9641478 | 12/1996 |
| WO | WO-9707656 | 3/1997 |
| WO | WO-9713368 | 4/1997 |
| WO | WO-9718675 | 5/1997 |
| WO | WO 97/22058 | 6/1997 |
| WO | WO-9731480 | 8/1997 |
| WO | WO-9742763 | 11/1997 |
| WO | WO-9748230 | 12/1997 |
| WO | WO-9749237 | 12/1997 |
| WO | WO-9749242 | 12/1997 |
| WO | WO-9803929 | 1/1998 |
| WO | WO-9806219 | 2/1998 |
| WO | WO-9810589 | 3/1998 |
| WO | WO-9817064 | 4/1998 |
| WO | WO-9821664 | 5/1998 |
| WO | WO-9827723 | 6/1998 |
| WO | WO-9828698 | 7/1998 |
| WO | WO-9828906 | 7/1998 |
| WO | WO-9833135 | 7/1998 |
| WO | WO-9928698 | 7/1998 |
| WO | WO-9837694 | 8/1998 |

(56) References Cited

FOREIGN PATENT DOCUMENTS

| WO | WO-9841020 | 9/1998 |
|----|------------|--------|
| WO | WO-9856172 | 12/1998 |
| WO | WO-9904561 | 1/1999 |
| WO | WO-9907142 | 2/1999 |
| WO | WO-9929109 | 6/1999 |
| WO | WO-9945700 | 9/1999 |
| WO | WO-9945702 | 9/1999 |
| WO | WO-9952285 | 10/1999 |
| WO | WO-9960789 | 11/1999 |
| WO | WO-0004706 | 1/2000 |
| WO | WO-0016548 | 3/2000 |
| WO | WO-0033160 | 6/2000 |
| WO | WO-0146843 | 6/2001 |
| WO | WO-0189213 | 11/2001 |
| WO | WO-2004052010 | 6/2004 |

OTHER PUBLICATIONS

Extended European Search Report and Written Opinion dated Jan. 21, 2011 in EP 07075232.

Extended European Search Report and Written Opinion dated Oct. 26, 2011 in EP 10183432.3 (7 pages).

"Intel and NBC Work to Speed the Developmental of Enhanced DTV," printed from the Internet at http://www.intel.com-pressroom-archive-releasesCn041999.htm on Jul. 15, 1999.

Rob Fixmer, "Windows 98 Feature Combines TV, Terminal and Internet," New York Times (Aug. 18, 1998).

The Wink Communications company homepage, printed from the Internet at http://www.atvef.com on Jul. 15, 1999.

"WebTV Plus Features: E-mail" printed from the Internet at http://www.webtv.net-products-pluswantmore3.html on Jul. 15, 1999.

"WebTV Plus Features: TV Features," printed from the Internet at http://www.webtv.net-products-pluswantmore.html on Jul. 15, 1999.

"WebTV Plus Service," printed from the Internet athttp://www.webtv.net-products-plus-on Jul. 15, 1999.

The Advanced TV Enhancement Forum Homepage Printed From the Internet at http://www.atvef.com on Jul. 15, 1999.

PROGRAM SURVEY:

1. HOW OFTEN DO YOU WATCH THIS PROGRAM?

[EVERY DAY] [ONCE A WEEK] [ONCE A MONTH]
　232a　　　　232b　　　　　232c

2. WHAT CATEGORIES OF TV PROGRAMS INTEREST YOU?

[MOVIES] [SPORTS] [COMEDY] [NEWS]
　234a　　234b　　234c　　234d

[NEXT SET OF QUESTIONS] 236  [SEND ANSWERS] 238  [CANCEL] 240

VISA®: IT'S EVERYWHERE YOU WANT TO BE

FIG. 9

SYSTEMS AND METHODS FOR PROVIDING A PROGRAM AS A GIFT USING AN INTERACTIVE APPLICATION

CROSS REFERENCE TO RELATED APPLICATIONS

This application is a continuation of U.S. patent application Ser. No. 11/408,747, filed Apr. 21, 2006, which is a continuation of U.S. patent application Ser. No. 09/356,245, filed Jul. 16, 1999 (abandoned), and which claims the benefit of U.S. Provisional Application No. 60/099,301, filed Aug. 26, 1998, all of which are hereby incorporated by reference herein in their entireties.

BACKGROUND OF THE INVENTION

This invention relates to television message systems, and more particularly, to techniques for supporting the transmission of messages in a television environment that may include an interactive television program guide.

A popular aspect of the Internet and other networking environments relates to e-mail messages. A network or Internet user can send e-mail messages to other users of the network or the Internet. Messages are delivered to a server where they are held until downloaded by a client such as a personal computer. The recipient of a message can access it at any time from the server and read it at his convenience.

Television programs are sometimes discussed in e-mail messages. However, there is generally no way in which users of a traditional e-mail message system may easily view a television program while exchanging messages about that program. A user might locate a television in the same room as the user's personal computer, but such an arrangement would be awkward to view. Moreover, many households locate their televisions in the living room, but are reluctant to locate their computers in the living room.

Although personal computers may be provided with tuner cards that allow television signals to be displayed on the computer monitor, many television viewers would prefer to view television on a traditional television set. Television sets generally offer greater viewing areas than computer monitors, so that users need not sit nearly as close to a television screen as they would a computer monitor. Televisions sets are also typically located in rooms within the home that are more suitable for watching television than where computers are typically located.

A system that attempts to integrate aspects of the Internet with the television viewing experience is available from WebTV Networks, Inc. of Palo Alto, Calif. The WebTV system permits television viewers to access the Internet through a WebTV Plus Receiver connected to their television sets. The WebTV Plus Receiver enables users to surf the World Wide Web on their television by connecting their televisions to the web-based WebTV Network through a standard phone line. The WebTV System permits users to view television program listings and web sites related to television programs that appear in the program listings.

The WebTV system also provides TV Crossover Links that allow users to access web sites that are related to television programs. The WebTV Plus Receiver detects data such as web links (i.e., universal resource locators (URL)) that is embedded in the video broadcast and notifies users with a TV Crossover Link watermark on the television screen. The TV Crossover Links permit users to link to web sites through the Internet related to the television program that the user is watching. The user can view the web site and the television program simultaneously through the WebPIP picture-in-picture function. If the web site supports e-mail features, the user might then send an e-mail message through the Internet while watching a television program. The WebTV system also provides users with e-mail accounts for sending and receiving e-mail through the Internet. A user can access a Web Home page from which he can send and receive e-mail.

Interactive television program guides implemented on set-top boxes allow users to view television program listings on their televisions. Such program guides allow users to view television program listings in different display formats and to perform various other functions. For example, a user may instruct the program guide to display a channel-ordered grid of current program listings. The user may also use the program guide to search for programs in a desired programming category such as sports, movies, news, or the like. If desired, the program guide may be used to order pay-per-view programming.

Previously known systems have not provided an integrated system allowing television viewers to view television programming and to exchange messages with other television viewers independent of the Internet. Previously known systems also have not provided television viewers with the opportunity to send messages to exclusively other viewers of a television program or channel. Previously known interactive program guides have not contained a feature that allows television viewers to exchange messages with each other.

It is therefore an object of the present invention to provide a television message system that provides a television viewer with an opportunity to view television programming and to exchange messages related to the television programming to other television viewers that does not rely solely on the Internet.

It is also an object of the present invention to provide an interactive television program guide that contains message features.

SUMMARY OF THE INVENTION

These and other objects of the invention are accomplished in accordance with the principles of the present invention by providing a television message system that receives television programming over a communications path from a television distribution facility such as a cable system headend. The television message system allows users to transmit messages relating to a given television program to users who are currently watching that television program.

The message system allows messages to be transmitted between users at user television equipment devices. The user television equipment devices may be connected to a television distribution facility (such as a cable system headend) by coaxial cables or other suitable communications paths that carry television signals. In an illustrative configuration, the system eliminates the need for additional communications paths physically separate from the paths that carry television signal broadcast channels for the transmission of messages.

The television message system of the present invention permits users to participate in a television program-related contest, promotion, or survey while watching a television program by sending and receiving messages through the television message system. The television message system also permits users to evaluate a television program and send the evaluation to a television program entity such as the TV channel or another user as a recommendation.

The television message system of the present invention permits users to compose and send a message to a television program entity such as the program producers or a program cast member. In addition, users can send messages through the television message system to other users, such as other users of an interactive program guide, Internet users, PC users, etc., who are connected to the user's television distribution facility through a communications network. The messages can be composed by the user, or the messages can be standard messages such as a reminder message to watch a particular program. Message may be composed on an interactive TV screen or on a display remote control device.

The television message system also allows a user to purchase a gift related to television programming for a recipient.

The television message system may be based on an interactive television program guide implemented on the set-top box. If desired, the system may be implemented on other suitable user television equipment such as a satellite receiver, an advanced television receiver (e.g. a high definitive television or HDTV receiver), a television into which set-top box circuitry is integrated or the like.

Further features of the present invention, its nature and various advantages will be more apparent from the accompanying drawings and the following detailed description of the preferred embodiments.

BRIEF DESCRIPTION OF THE DRAWINGS

FIG. 9 is a depiction of an illustrative television message system display screen for providing the user with an opportunity to participate in a survey relating to television programming in accordance with the present invention.

DETAILED DESCRIPTION OF THE PREFERRED EMBODIMENTS

Figure 1A:
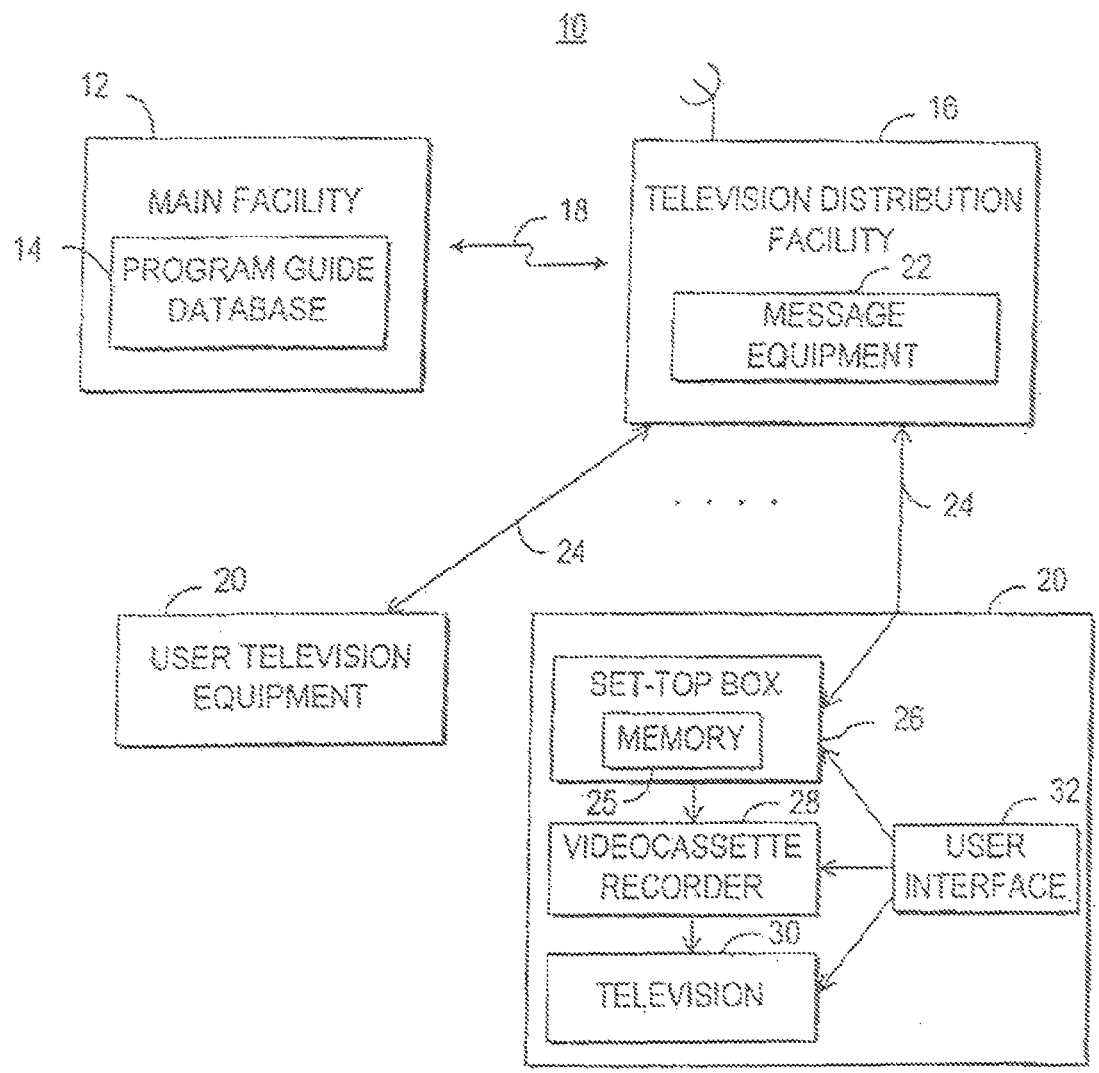
FIG. 1A is a diagram of a television message system in accordance with the present invention.

An illustrative television message system 10 in accordance with the present invention is shown in FIG. 1A. Main facility 12 may contain a program guide database 14 for storing program guide information such as television program guide listings data, pay-per-view ordering information, etc. Database 14 allows system 10 to support an interactive television program guide if desired. Although the television message features of the present invention may be provided using a television message system without a program guide, certain aspects of the invention will be described primarily in the context of an interactive television program guide system configuration for specificity and clarity.

Information from database 14 may be transmitted to television distribution facility 16 via communications link 18. Link 18 may be a satellite link, a telephone network link, a fiber optic link, a cable link, a microwave link, a combination of such links, or any other suitable communications path.

Television distribution facility 16 is a facility for distributing television signals to users, such as a cable system headend. Some aspects of the invention may be implemented using a television distribution facility such as a broadcast distribution facility, or a satellite television distribution facility. Only one television distribution facility 16 is shown in FIG. 1A to avoid over-complicating the drawings. In general, however, main facility 12 distributes information to multiple television distribution facilities.

The program guide information transmitted by main facility 12 to television distribution facility 16 includes television program listings data such as program times, channels, titles, descriptions, etc. The information transmitted from main facility 12 may also include information on interactive message features (e.g. television program contests, surveys, evaluations, promotions, etc.) that are available for particular television programs or channels.

If desired, some of the program guide data and other TV message information may be provided using data sources at facilities other than main facility 12. For example, data relating to available television program-specific message features (e.g. a contest, promotion, survey, etc.) may be provided by a television program entity associated with a television channel, or other facility that is separate from main facility 12 and television distribution facility 16.

Television distribution facility 16 distributes program guide data and other information to the user television equipment 20 of multiple users via communications paths 24. Communication paths 24 are preferably bidirectional to support messaging and preferably have sufficient bandwidth to allow television distribution facility 16 to distribute scheduled television programming, pay programming, messages, and other video and audio information to user television equipment 20 in addition to non-video program guide information and messages. The messages supported by communication paths 24 may be text-based or, if more bandwidth is available, may be audio or video messages. If television distribution facility 16 is a cable system headend, communications paths 24 may be based on coaxial cable or fiber optics or the like. If television distribution facility 16 is a satellite system or broadcast system, unidirectional paths may involve transmitting information in free space. Bidirectional paths may have a free-space downlink to the home and a telephone line or cable or fiber optic return path from the home to the television distribution facility 16.

User television equipment may be based, for example, on a set-top box or other such device. For clarity, many aspects of the invention are described in connection with this illustrative arrangement, although any other suitable hardware arrangement for the user television equipment 20 may be used if desired.

Multiple television and audio channels (analog, digital, or both analog and digital) may be provided to user television equipment devices 20 (including, e.g., set-top boxes 26) via communications paths 24. If each path 24 includes a number of traditional analog television channels, one or more of these channels may be used to support a number of digital channels. The bandwidth of each analog channel that is used to support digital channels may support ten or more of such digital channels. Two-way digital channels typically require more bandwidth than one-way digital channels. Such two-way digital channels may support two-way communications in the form of messages between set-top boxes 26 and a server (e.g. at television distribution facility 16). If two-way communications between set-top boxes 26 and television distribution facility 16 involve only text or audio signals, the bandwidth required to support such two-way communications may be substantially less than the bandwidth required to support two-way communications involving video.

Messages may be distributed along communications path 24 using any number of suitable techniques. For example, text messages may be distributed using out-of-band channels on paths 24 using out-of-band modulators. Video or audio messages may be more efficiently transmitted using one or more digital channels on path 24. Such digital channels may also be used for distributing text and graphics. Any suitable communications protocols may be used for sending messages and the like. For example, communications may be analog or digital, synchronous or asynchronous, pocket-based, Internet protocol transmissions, etc.

Dedicated digital or analog channels, or at least an allocated portion of the available bandwidth in communications paths 24, may be used for the transmission of messages. Such dedicated channels may be separate from the channels used for transmitting television program broadcast signals to the user television equipment.

Because communications paths 24 support transport of messages between user television equipment devices 20 and television distribution facility 16, the arrangement of system 10 may eliminate the need for separate telephone lines connected to user television equipment 20 to transmit messages (although such telephone lines may be used with certain aspects of the invention if desired). If desired, television programming may be transmitted to user television equipment 20 along one communications path such as a satellite link from a satellite system, while messages to and from the user are distributed over a second communications path such as a telephone or cable.

Television distribution facility 16 preferably has a server or other suitable computing equipment or audio or video equipment such as audio voice mail equipment (herein collectively referred to as message equipment 22) for supporting the transmission of messages between users. For clarity, certain aspects of the invention are simply described as being implemented using a message server although these aspects of the invention are also applicable to other types of message equipment. The message equipment 22 (e.g., a message server) may be capable of handling messages involving text, graphics, video, or audio data. If desired, the bandwidth requirements of message equipment 22 may be reduced by restricting messages to text, audio, and/or graphics, rather than including video. Message equipment 22 in television distribution facility 16 may be configured in a client-server arrangement in which each piece of user television equipment 20 (i.e., each user television equipment device 20) acts as a client processor.

Each user has a receiver, which is typically a set-top box such as set-top box 26, but which may also be other suitable television equipment into which circuitry similar to set-top box circuitry has been integrated. For example, user television equipment 20 may be based on an advanced television receiver such as a high-definition television (HDTV) receiver or other such television-based platform. A set-top box may include a DOCSIS modem for use in two-way communication to and from a server or television distribution, facility. For clarity, the present invention will be described primarily in the context of user television equipment 20 that is based on set-top boxes 26. As shown in FIG. 1A, each set-top box 26 may have memory 25. Memory 25 may be used, for example, for maintaining a database of program listings data.

Program guide information may be distributed to set-top boxes 26 continuously (in real-time), periodically, on request (using a client-server arrangement), or using a combination of these techniques. Messages may be distributed to set-top boxes 26 in real-time or on-demand (e.g., when a user checks his e-mail or message equipment 22 and requests a message for viewing). The message equipment may receive messages from set-top boxes 26 in real-time or periodically.

Main facility 12 preferably contains a processor to handle information distribution tasks. Each set-top box 26 preferably contains a processor to handle tasks associated with implementing an interactive television program guide application containing television message features or an independent television messaging application on the set-top box 26 (hereinafter collectively referred to as a television messaging set-top box application or simply a set-top box application). Television distribution facility 16 preferably contains one or more processors (e.g., part of message equipment 22) for tasks associated with the distribution of messages and for tasks associated with providing program guide data to the program guide on the set-top boxes.

It should be understood that some or all of the functions of the program guide or the messaging set-top box application hereinafter described may be integrated into an operating system on the set-top box, implemented as a stand-alone application on the set-top box, or performed by a server (e.g. part of message equipment 22 or separate from the television distribution facility). In client server architecture, the set-top box sends data or requests to the server. The server can store and process data and send the results of a request back to the user television equipment for further processing, display, or storage. Any of the functionality of the set-top box application hereinafter described may be implemented using client-server architecture.

Various mechanisms may be used for launching the television messaging set-top box application from a program guide application on the user's set-top box. One mechanism involves using a hot link to launch the television messaging set-top box application. Hot linking involves invoking a non-program-guide application such as television messaging set-top box application with information such as a web site address, e-mail address, program title, or other information that has been preselected based on the current content of the program guide or status of set-top box 26. For example, if the user is watching a program, viewing a program listing, viewing the description of a program, or taking other action within the program guide related to a given program, channel, type of channel, or the like and the user directs the program guide to launch a non-program-guide application, the program guide may launch that non-program-guide application and direct that non-program-guide to take an action related to the given program, channel, type of channel, or the like.

Hot links may be activated by dedicated buttons, a launch button, menu options, or any other suitable technique. For example, a remote control may be provided with a dedicated message button, a dedicated shopping button, and similar buttons associated with other non-program-guide applications. When the user presses the message button, the program guide launches the television messaging set-top box application and directs the television messaging set-top box application to set up a message to a character in the program, a fan club, or other message recipient associated with the program. When the user presses a shopping channel button, the program guide launches a shopping application (e.g. for purchasing gifts for recipient users) and directs the program guide to preselect merchandise related to the program. Further features of an illustrative hot linking system are described in Ellis et al. U.S. patent application Ser. No. 09/346,134, filed Jul. 16, 1999, which is hereby incorporated by reference herein in its entirety.

Each set-top box 26 is typically connected to an optional videocassette recorder 28 or other such recording device so that selected television programs may be recorded. Each videocassette recorder 28 (or set-top box 26) is connected to a television 30. To record a program, set-top box 26 tunes to a particular channel and sends control signals to videocassette recorder 28 (e.g., using an infrared transmitter) that direct videocassette recorder 28 to start and stop recording at the appropriate times.

During the use of the television message systems, the television messaging set-top box application on set-top box 26 may display messages on television 30. If the television message system includes an interactive television program guide, the interactive television program guide may display program listings on television 30. A program guide with message features may also be used to display the messages. Each set-top box 26, videocassette recorder 28, and television 30 may be controlled by one or more user interfaces 32 which may involve a remote control, mouse, trackball, microphone, digital video camera, dedicated set of buttons, etc.

Figure 1B:
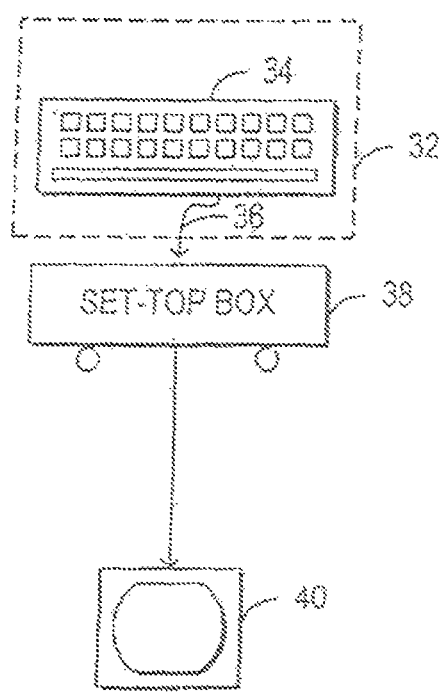
FIG. 1B is a diagram of a user television equipment device having a user interface based on a wireless keyboard in accordance with the present invention.

As shown in FIG. 1B, user interface 32 may contain a wireless keyboard 34 that sends signals 36 (e.g. infrared signals) to set-top box 38, which is connected to television 40. The user's input may be displayed as part of a television message system display screen on television 40 as the input is entered through wireless keyboard 34. If television message system 10 is based on an interactive television program guide, the display screen provided on television 40 by set-top box 38 may be on an interactive television program guide display screen. The displayed interactive television program guide display screen or other program guide display screens provided by the program guides may contain program listings.

Figure 1C:
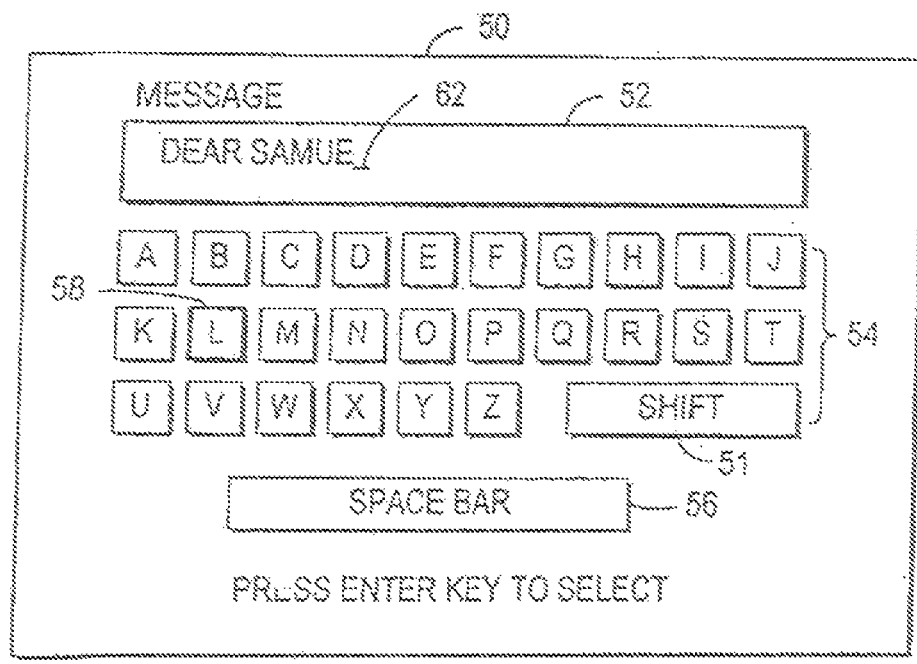
FIG. 1C is a diagram of a television screen keyboard user interface in accordance with the present invention.

User interface 32 may also be based on a television screen keyboard 50 as illustrated in FIG. 1C. The user can select letters from the displayed alphabet to compose a message 52. In particular, the user may select letters from alphabet keys 54 and spaces from space bar 56. The user may select a letter so that it becomes highlighted (such as letter L 58) by pressing arrow keys and an enter key (also called an OK or select key) on a remote control. Pressing the OK key on the remote control directs the program guide containing message features or the independent messaging application to place the selected letter adjacent to cursor 62. The user may select SHIFT option 51 to place a capital letter in message 52. In this way, a user can compose the text of a message.

Figure 1D:
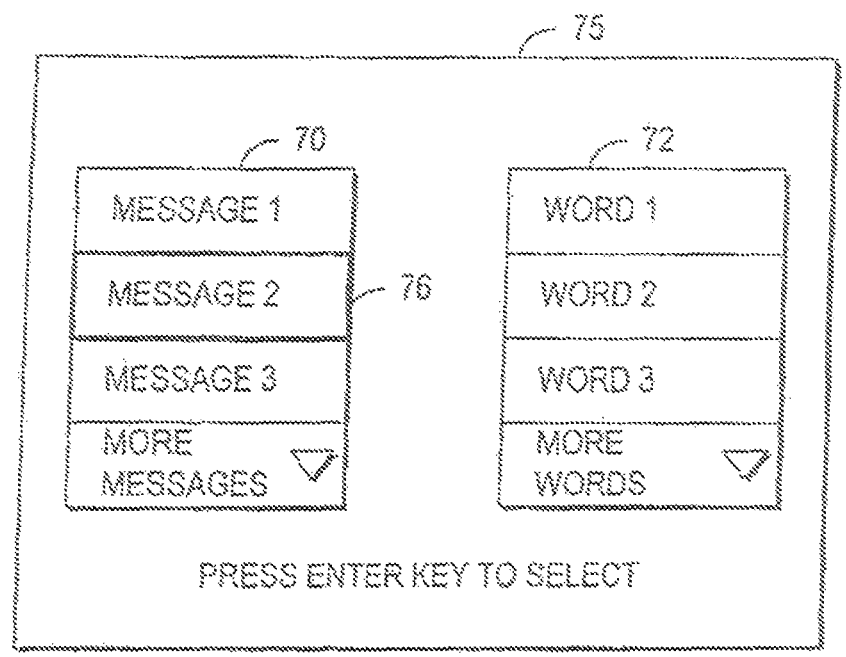
FIG. 1D is a diagram of a user interface television display screen providing a list of standard messages or words in accordance with the present invention.

If desired, the user may compose messages by selecting from a list of standard messages 70 or words 72 displayed in a display screen such as display screen 75, as shown in FIG. 1D. The words or messages may be predetermined, determined by the user, or both. If determined by the user, they may be specifically entered by the user into the list, or they may be automatically saved by the system based on messages previously sent by the user. A word or message can be selected by pressing arrow keys on a remote control to place highlight region 76 on top of a particular word or message such as "message 2" in FIG. 1D. The user can then select the highlighted word or message by pressing a remote control enter (or select or OK) key.

System 10 allows users at user television equipment 20 to exchange television program-related messages while watching television. The user may send messages with system 10 without investing the effort involved in operating a personal computer and the software that is associated with it. In addition, system 10 allows users to retain the high video quality and channel range of television viewing while exchanging messages with similarly situated users.

Figure 2A:
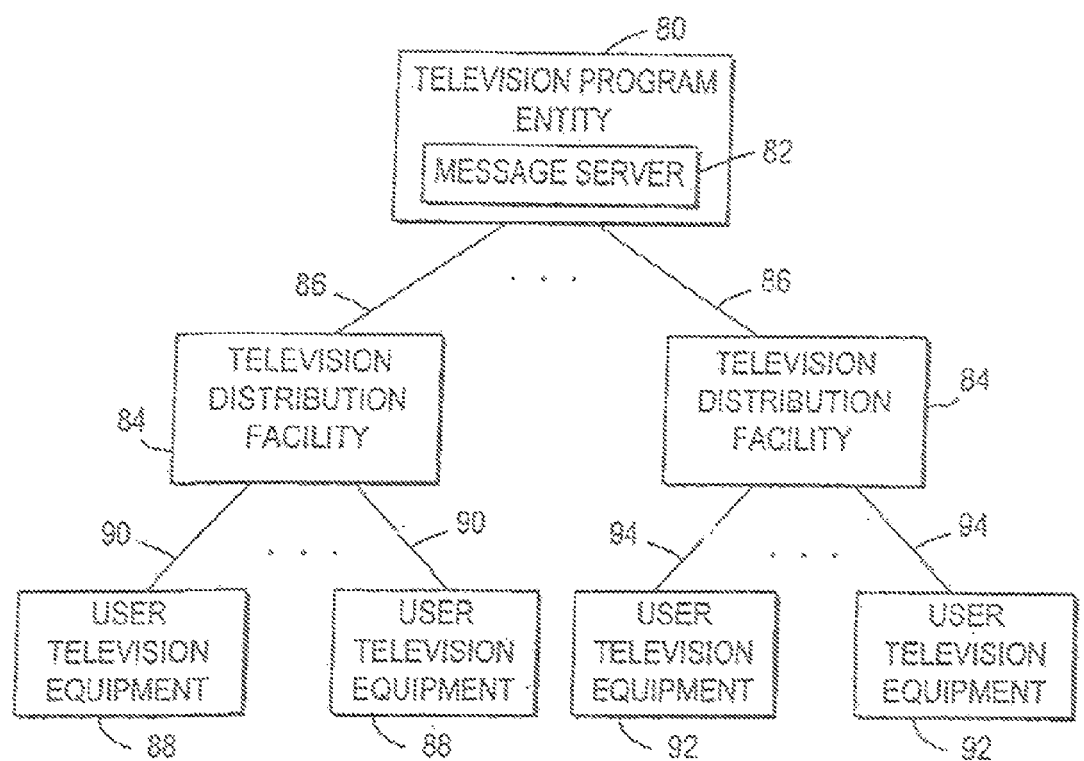
FIG. 2A is a diagram of a system configuration in which user television equipment devices of multiple television distribution facilities are connected via a television program entity in accordance with the present invention.

As shown in FIG. 2A, a television program entity 80 may contain a message server 82 to store messages sent between user television equipment 88, 92, and any other such user television equipment. The television program entity may be a message facility associated with a television channel that receives and processes messages sent by users of user television equipment devices to a television program or channel. User television equipment devices 88 and 92 are connected via communications paths 90 and 94 respectively to television distribution facilities 84 that are in turn connected to television program entity 80 via communication links 86. Communications links 86 may be satellite links, telephone network links, fiber optic links, cable links, microwave links, combinations of such links, or any other suitable communications path.

Figure 2B:
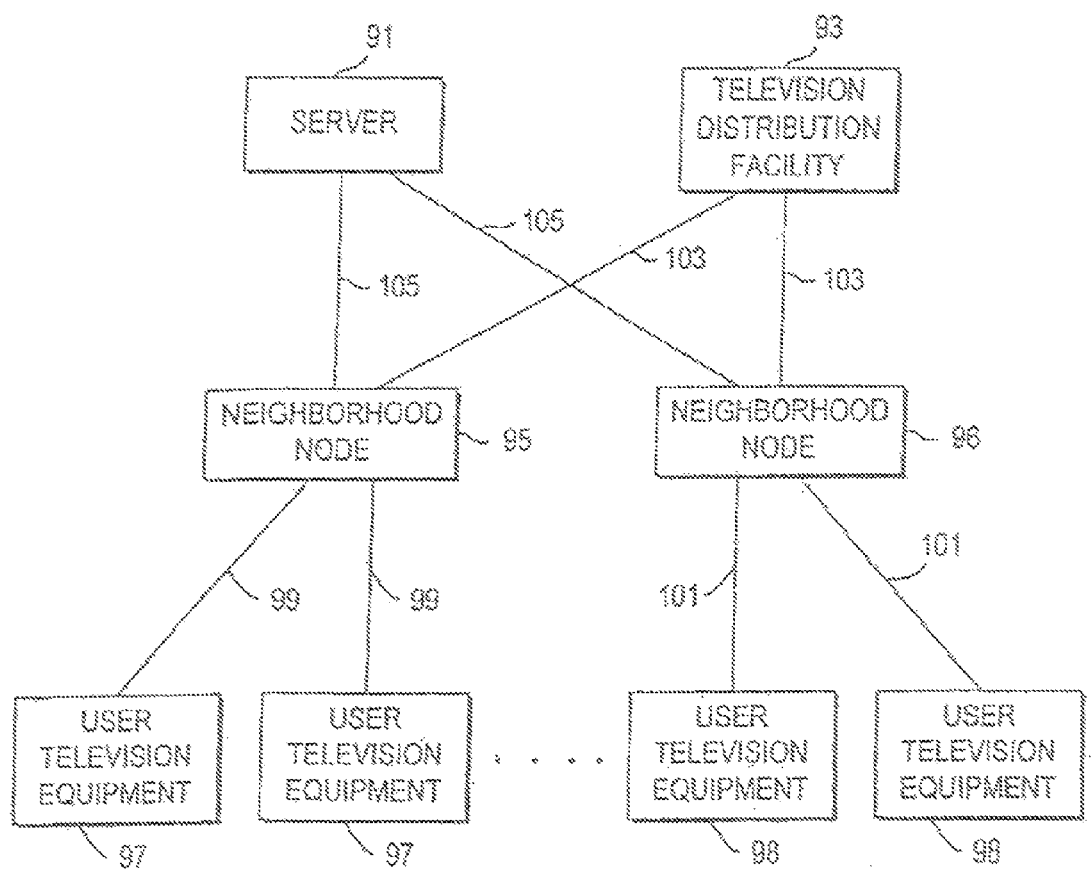
FIG. 2B is a system diagram showing how multiple user television equipment devices may be connected to a television distribution facility and a separate server via neighborhood networks in accordance with the present invention.

Messages may be handled on a server that is not located at the television distribution facility as shown in FIG. 2B. For example, messages may be stored on server 91 and transmitted between user television equipment devices 97 and 98 via neighborhood nodes 95 and 96. User television equipment device 97 are connected to neighborhood node 95 via communications path 99, and user television equipment devices 98 are connected to neighborhood node 96 via communications path 101. Neighborhood nodes 95 and 96 decrease the bandwidth requirements on communications paths 103 for a given number of user television equipment devices 97 and 98. Neighborhood nodes 95 and 96 route television programming from television distribution facility 93 to user television equipment 97 and 98. Neighborhood nodes 95 and 96 may also route messages between server 91 and user television equipment 97 and 98.

Neighborhood nodes 95 and 96 may also route requests to perform many of the message system functions described herein from user television equipment 97 and 98 to server 91. Responses from server 91 are routed back to the appropriate user television equipment device via a neighborhood node.

Figure 3:
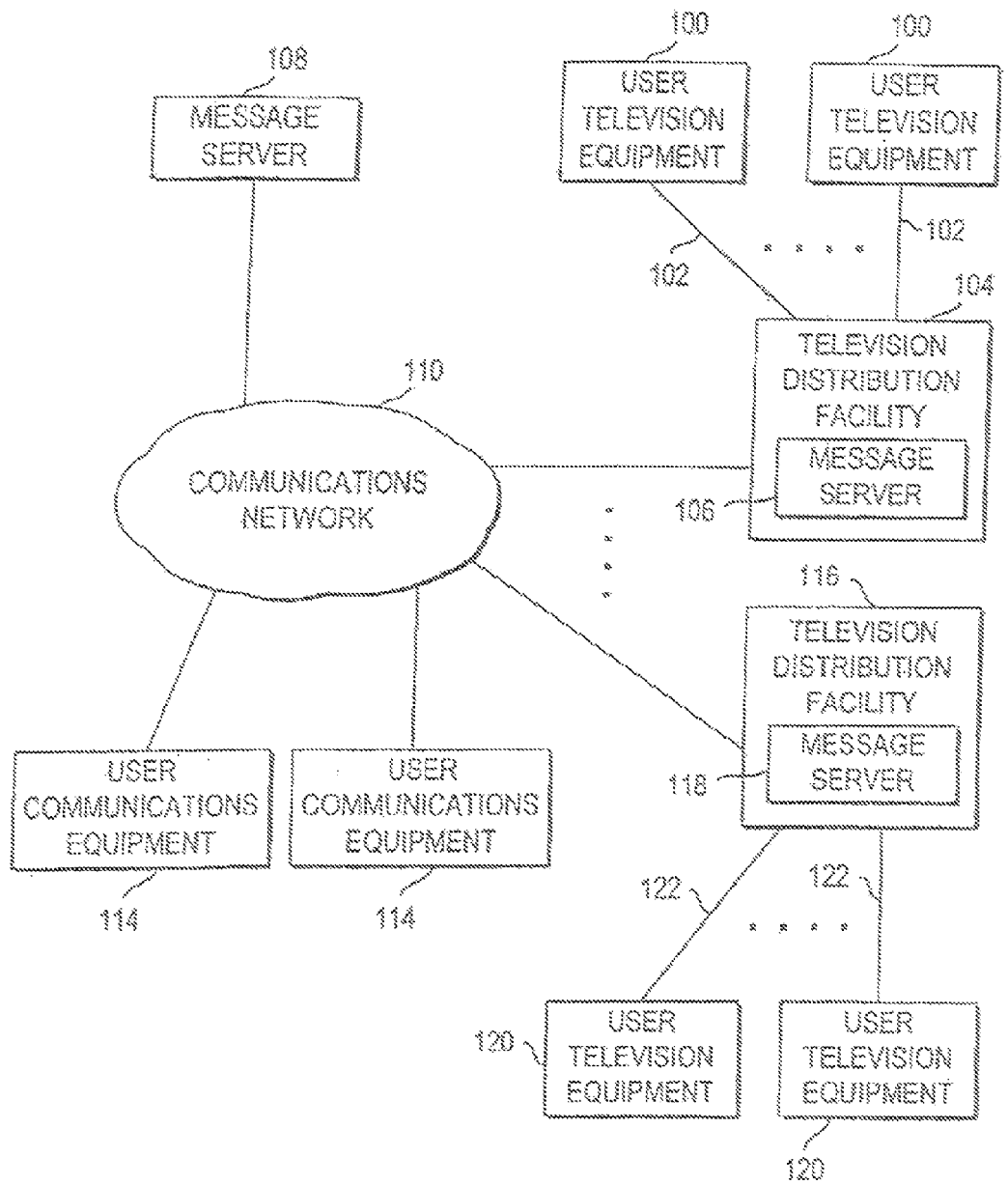
FIG. 3 is a diagram showing how multiple television distribution facilities and user communications equipment devices may be connected via a communications network in accordance with the present invention.

As shown in FIG. 3, messages can be distributed along communication paths 102 from one user television equipment device 100 associated with television distribution facility 104 to another user television equipment device 100 associated with that facility using a message server 106 located at the facility. The messages sent between two or more user television equipment devices 100 associated with television distribution facility 104 may be stored on message server 106 in television distribution facility 104. An advantage to limiting operation of the message system to individual television distribution facilities is that it allows individual cable system operators (for example) to control their systems, and it does not involve coordinating the transmission of messages related to an on-going television program between different geographical areas or different time zones. If desired, messages exchanged by user television equipment 100 can be stored by a message server 108 that is connected to television distribution facility 104 via communications network 110. Communications network 110 may be any suitable communications network such as the Internet, a public or private telephone network, a network involving satellite link or wireless links, a cable network, etc.

The message system may also be configured so that users at one or more of user television equipment devices 120 may exchange messages with one or more of user television equipment devices 100. User television equipment 120 is associated with a different television distribution facility than user television equipment 100. User television equipment devices 120 are connected to television distribution facility 116 via communications paths 122. Message server 118 may be used to store messages. The configuration of message server 118 and user television equipment 120 may be based on a client-server arrangement. Television distribution facilities 104 and 116 may be connected to each other via communications network 110. Messages that are sent between user television equipment 100 and user television equipment 120 may be stored on message servers 106, 108, or 118. If desired, any number of television distribution facilities may be connected togther via communications network 110 or other such communications networks to allow user television equipment from these television distribution facilities to exchange messages with each other.

In addition, messages may be transmitted between user television equipment 100 or 120 and user communications equipment 114. User communications equipment 114 is connected via communications network 110 to television distribution facilities 104 and 116. User communications equipment devices 114 can be any number of, e.g., personal computers that can send and receive messages.

Another aspect of the present invention involves using the television messaging set-top box application to provide the user with an opportunity to send messages related to a television program or channel which can be sent to certain recipients. Messages transmitted between set-top box application users are sent from one set-top box and stored at a message server. The recipient user's set-top box can download the message from the message server after logging onto the message server. Once the message has been downloaded onto the recipient's set-top box, the recipient can review the message using message features provided by the set-top box application. The messages sent in this format may be delayed in the sense that they are not necessarily received by the recipient immediately after they are sent. The messages can be stored on a message server for a long time until recipients access them. Messages may also be sent by a user of a user television equipment device to a television program entity such as a television channel using the television messaging set-top box application.

Communications may also be sent between set-top boxes in the form of instant messages. Instant messages are messages that are only stored temporarily at the recipient end. An instant message is available for viewing by a recipient only for a limited period of time after which the message is purged from memory. The message is purged regardless of whether the recipient actually opens the message during the time period it is available. Instant messages are useful for transmitting information that is valid only for a limited period of time. For example, one user may wish to send a message containing the score of a football game to another user in the form of an instant message because the score may change continuously throughout the game.

Figure 4:
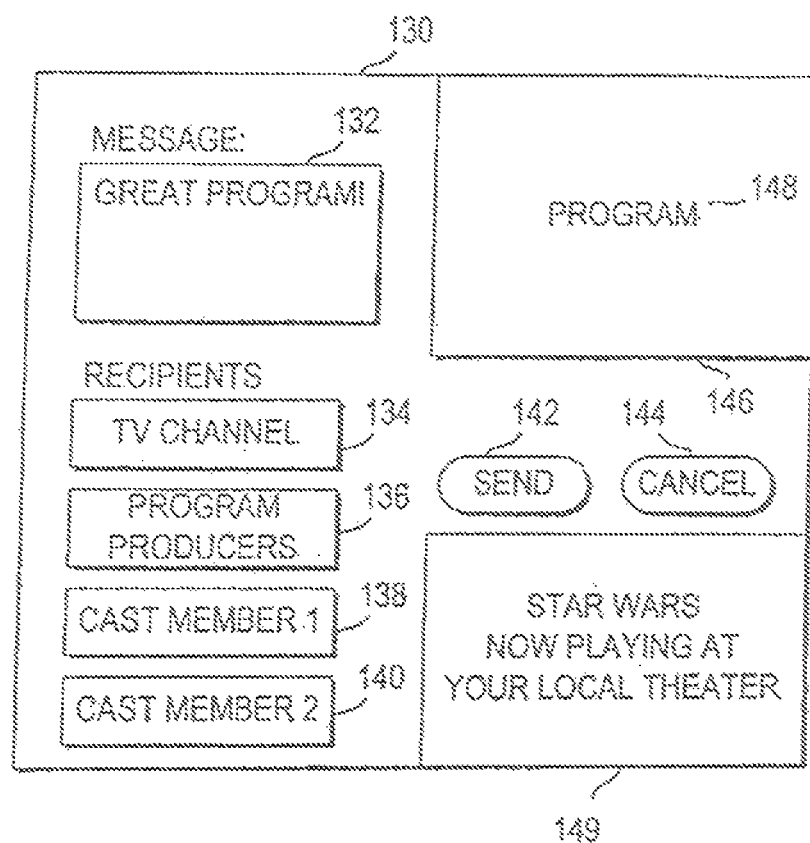
FIG. 4 is a depiction of an illustrative television message system display screen containing a reduced-size version of a televison program for providing a user with an opportunity to compose a message and to transmit the message to a television program entity in accordance with the present invention.

Referring now to FIG. 4, television display screen 130 provides the user with the opportunity compose a human-readable message 132 related to a television program 148. Television message system display screen 130 may allow television program 148 to be displayed (e.g., in window 146 of the television screen) concurrently with the interactive message features shown in FIG. 4. Program 148 is reduced in size to fit fully within window 146. Advertisement 149 may also be concurrently displayed in display screen 130. Advertisements may accompany any of the display screens or user interface screens of the present invention.

The set-top box application may display screen 130 automatically at an appropriate time while the user is watching a television program 148. The set-top box application may also display screen 130 upon prompting by the user (e.g. when the user presses a message button on the remote control). Information that indicates that the television program has associated message options such as those shown in FIG. 4 may be provided to the set-top box application using any suitable data distribution technique. For example, TV message information may be obtained on-demand by the set-top box from a server or with the program guide listings from the main facility. If desired, TV message information may be encoded digitally in-band with the television program signal on a digital channel. The message information may be decoded by a digital set-top box along with the TV program signal. The TV message information may also be digitally encoded on a digital channel separate from the TV program signal. As another example, TV message information may be maintained at a television distribution facility and distributed to set-top box applications over the vertical blanking interval (VBI) of a standard analog television signal. A VBI decoder located in the set-top box may be used to decode data contained in the VBI of the received television signal. TV message information relating to any of the herein described features of the present invention (e.g. surveys, contests, promotions, purchasing merchandise) may be provided to the user using any of the above suitable techniques.

The decoded data may then be used by the set-top box application to determine whether an option exists for the user to send a message to a TV program entity based on the received data. The data decoded by the set-top box also can indicate which message options are available and the return path or destination address to which the messages can be sent (e.g. the e-mail address of a television program entity which is designated to receive and process the messages from the users). If desired, TV message information may be provided using an out-of-band data path. Such information may also be provided as a digital data stream that accompanies other streams of digital data (such as digital data for various television programs).

Screen 130 allows the user to send a human-readable message 132 (e.g., a text message or a graphic message containing text) to the TV channel which broadcasts program 148 by selecting option 134, the television program producers of program 148 by selecting option 136, or an individual cast member of program 148 by selecting an option such as option 138 or option 140. Television channels include networks such as ABC, local affiliates, local broadcast stations, pay-per-view channels, cable channels such as HBO and CNN, etc. Once the user of the set-top box application has chosen one or more desired recipients of the message, the user may send the message by selecting send option 142.

The television message system will then deliver the message to a television program entity such as a television message facility associated with the television channel that is designated to receive messages from users of user television equipment devices. The television program entity will process the messages, and respond to them if necessary. For example, a designated television channel representative at the television program entity may read and respond to messages sent to the television channel. The television program entity who actually receives the message from the user may also be, for example, the personal e-mail address of a cast member or program producer. The user may cancel the message and return to a full screen view of the current program 148 by selecting option 144.

Figure 5:
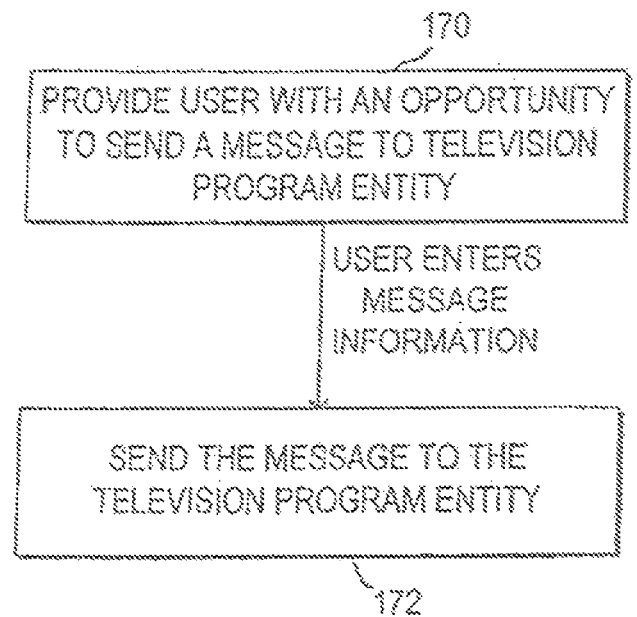
FIG. 5 is a flow chart showing steps involved in an illustrative approach for providing a user with an opportunity to send a message to a television program entity in accordance with the present invention.

An illustrative process for sending a message to a television program entity recipient is shown in FIG. 5. At step 170, the set-top box application (i.e. the interactive program guide with message features or the stand-alone messaging application) functioning on the user television equipment provides the user with an opportunity to send a message to a television program entity recipient, for example, the television channel, television program producers, or individual television program cast members. The set-top box application may provide the user with an opportunity to indicate a desire to send the message by displaying an interactive screen such as screen 130 (FIG. 4). The interactive screen may be displayed automatically or when the set-top box application is prompted by the user. The interactive screen may provide the user with an opportunity to enter the text of a message and designate the intended recipients of the intended message. If desired, the recipients of the message may be preselected if there is only one potential recipient of the message. The user may then enter the message information. The message information may include the text of the message and may include the designated recipients.

At step 172, the television message system sends the message to a message server associated with the television program entity which is designated to receive and process messages relating to the television program, or channel. The set-top box application may obtain the information necessary to forward the message to a television program entity (e.g. the recipient's destination address) from the program guide information obtained from the main facility or from data associated with a television program (e.g., data embedded in the VBI of the television program signal). The destination address may be an e-mail address or other information identifying a location where electronic messages may be sent. The destination address may also be stored at the television distribution facility. In this case, the set-top box application may forward the message to the television distribution facility, which would then forward the message to its destination.

Figure 6A:
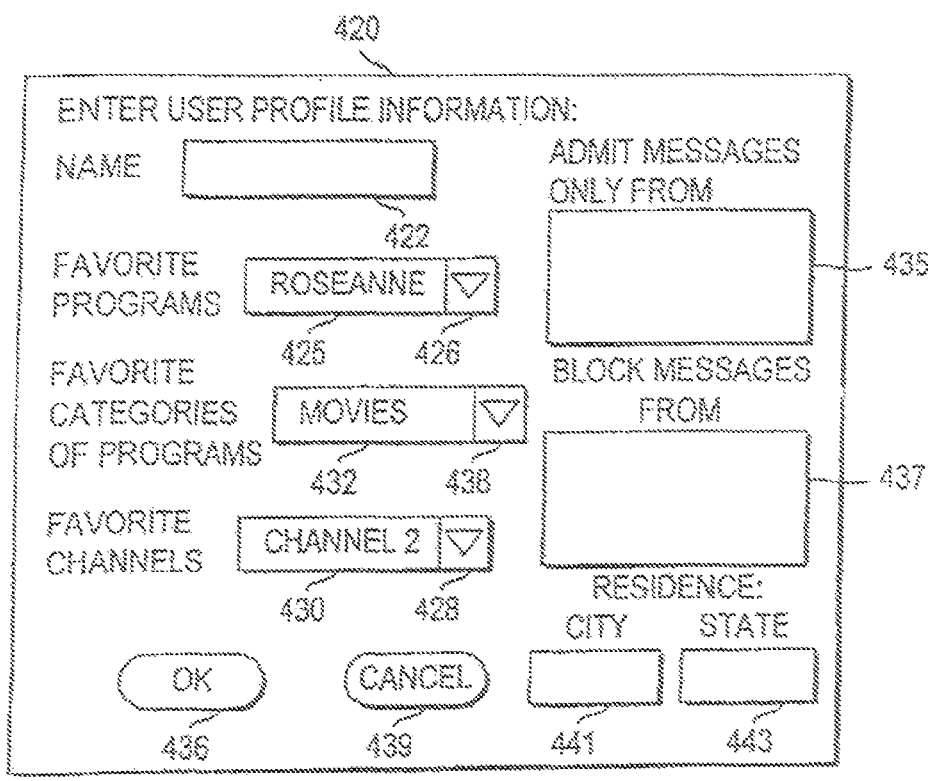
FIG. 6A is a depiction of an illustrative television message system display screen for entering user profile information in accordance with the present invention.

The television messaging set-top box application may also present the user with the option of entering profile information data for users in the user's household. An illustrative television messaging system display screen 420 that the television messaging set-top box application may present on a user's television set to enter user profile information is shown in FIG. 6A. The names of users may be entered in box 422. That user's favorite programs may be selected from a pull down or expandable list 425. Additional programs in the pull down list can be displayed on television messaging system display screen 420 if the user selects arrow 426. The user's favorite categories of programs such as sports programs, movies, news segments, sitcoms, etc. may also be selected from pull down list 432. The user can select arrow 438 so that additional categories of programs may be displayed. The user's favorite channels may be selected from a pull down list 430. The user can select arrow 428 so that additional channels may be displayed on the user's television display screen. Information about the user that is not related to TV programs may also be entered as part of the user's profile (e.g. birth date, place of residence, age, etc.). The user may enter his city and state of residence in regions 441 and 443 of screen 420.

Television display screen 420 may also provide the user with an opportunity to filter the messages that are sent to that user. The user may specify that all incoming messages are to be blocked, except for those other users whom the user identifies in box 435. Alternatively, the user may specify that only messages from certain recipients should be blocked. The user may identify these recipients in box 437. The filtering function may be performed by the set-top box or by the message equipment. The set-top box or the server checks all the incoming messages and does not accept messages from the blocked recipients.

A user may select OK option 436 when he has finished entering user profile information. The data entered is preferably stored in the set-top box, but may be stored at a remote server or elsewhere in the hardware of the user television equipment device such as a separate storage unit connected to the set-top box. The user may select cancel option 439 to exit display screen 420. User profile information will not be saved if the user selects cancel option 439. Further features of an illustrative system for entering user profile information are described in Ellis et al. U.S. patent application Ser. No. 09/034,934 filed Jun. 11, 1999, which is hereby incorporated by reference herein in its entirety.

In addition, the message system may be configured similar to the ICQ system so that a user may make his profile information public so that it can be accessed by other users. ICQ is an Internet tool that informs Internet user's who is on-line at any time and enables users to contact them at will. ICQ can search for an individuals on-line and alert a user when they log on. ICQ allows a user to chat, send messages, files, URL's, play games, or just hang out with fellow Internet users while surfing the Internet.

A user may fill out a questionnaire through the message system which includes information regarding the user's television program preferences as well as additional non-television related information about himself such as his hobbies (e.g. using display screen 420). The user profile information may be useful for finding other users who are interested in exchanging messages relating to certain topics. The user profile information may be stored at a remote server or jointly on the set-top boxes. A user may access profiles which have been made public and form a "buddy list" or address book of other users who have the same interests. The buddy list can include a user's identity, TV preferences, and other interests.

The message system may be set up so that a user must obtain permission from a second user before he is able to obtain the second user's profile information. For example, the message system may send the second user a message indicating the first user has requested the second user's profile information. If the second user accepts the request, the message system allows the first user to add the second user to his buddy list so that he can have access to the second user's profile information. In addition, the message system may ask the second user if he wishes to add the first user to his buddy list. A user may add further information to the profile based on his knowledge of the other user's preferences. The message system may also allow users to search for other users based on an ICQ number, an e-mail address, TV program preferences, and/or other preferences.

Figure 6B:
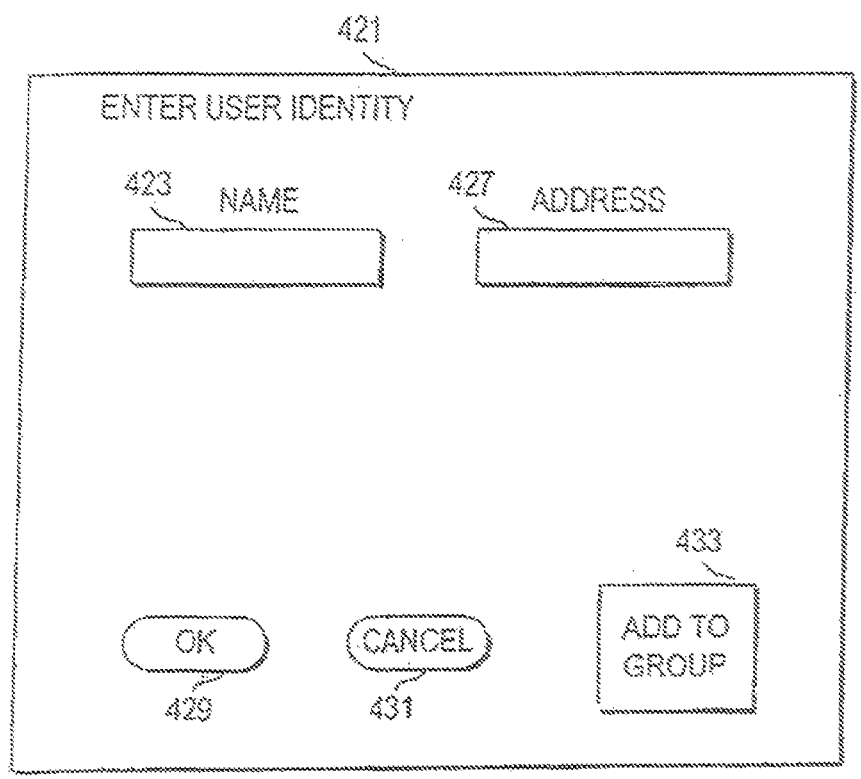
FIG. 6B is a depiction of an illustrative television message system display screen for entering a user's name and address in accordance with the present invention.

An illustrative television messaging system display screen 421 that the television messaging set-top box application may present on a user's television set to enter user identity information is shown in FIG. 6B. Television messaging system display screen 421 in FIG. 6B provides the user of the user television equipment with an opportunity to enter a user's name in box 423, and a user's address in box 427. Identities for users of user television equipment devices and user communications equipment devices may be entered in display screen 421. For example, an e-mail address may be entered in box 427 for users of user communications equipment. A user of a user television equipment device may have an address which is a unique identifier assigned to a particular user allowing a message server to restrict access to a message only to the proper recipient. The address for the user of a user television equipment may be entered in box 427.

When the user selects OK option 429, the set-top box application will save the user identity information (i.e. the user's name and address) in a memory device such as memory 25 in FIG. 1A. The user identity information may also be stored at a server instead of a set-top box. When the user selects cancel option 431, the set-top box application will exit display screen 421 and will not save any information the user has entered in boxes 423 and 427. The user selects option 433 if the user wishes to add the user identity entered in boxes 423 and 427 to a group of identities that will appear as a single entry in an address book, such as "Hockey Fans" in address book 440 shown in FIG. 6C. The identity group feature allows the user to compile a list of the identities of friends who enjoy watching the same television program, channel, or category of programs into a group. The user can then send a message to everyone in that group while watching a television program that everyone in the group is interested in by selecting that group in the address book. The members of the group of identities will receive the message on their set-top box and will be able to read it while they are watching the same television program as the sender of the message.

Figure 6C:
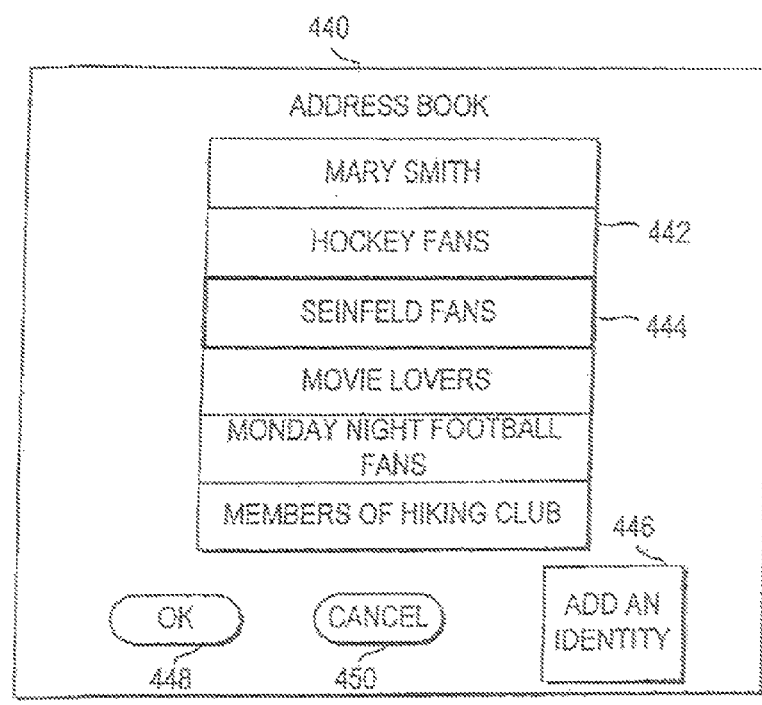
FIG. 6C is a depiction of an illustrative address book for users in accordance with the present invention.

The identities of users whose identity information has been entered in display screen 421 of FIG. 6B may be displayed by the set-top box application in an address book format on the television screen. The television messaging system display screen shown in FIG. 6C is an example of such an address book. Address book display screen 440 displays a list of identities 442 of users or groups of users. The users can be individuals such as Mary Smith, or groups of individuals such as Hockey Fans as illustrated by the names in the list 442. An individual user may be part of more than one group in the address book. For example, Mary Smith may appear in the address book as an individual, and be a member of the groups "Seinfeld Fans" and "Movie Lovers." List 442 may contain groups of individuals who are interested in a particular program, type of program, or any other group identified by the user such as "Hockey Fans," "Members of Hiking Club," "Seinfeld Fan Club," or "Movie Lovers." The groups need not be TV-related. If desired, the set-top box application may present a pop-up option on the television screen to send a message to the individuals in a list in the address book when the user is watching a related television program (e.g. Seinfeld).

The user may select a recipient or recipients of a message, recommendation, gift, reminder, etc., by selecting an identity or identities in the list. Option 444 is highlighted to indicate that the user has selected "Seinfeld Fans" to be a recipient of a message. The user may select as many recipients of the message as he desires from the names in the list. The user may choose to enter additional identities of other users by selecting option 446 which returns the user to television display screen 421 in FIG. 6B.

When the user has selected the recipients of the message (e.g., using arrow keys and pressing enter), the user may then position the highlight region on OK option 448 and press enter. The television messaging set-top box application may then retrieve the addresses for each recipient of the message. The television message system may then deliver the message to the appropriate message equipment for each of the recipients. The user may select option 450 to cancel and exit from the address book display screen 440.

Figure 7:
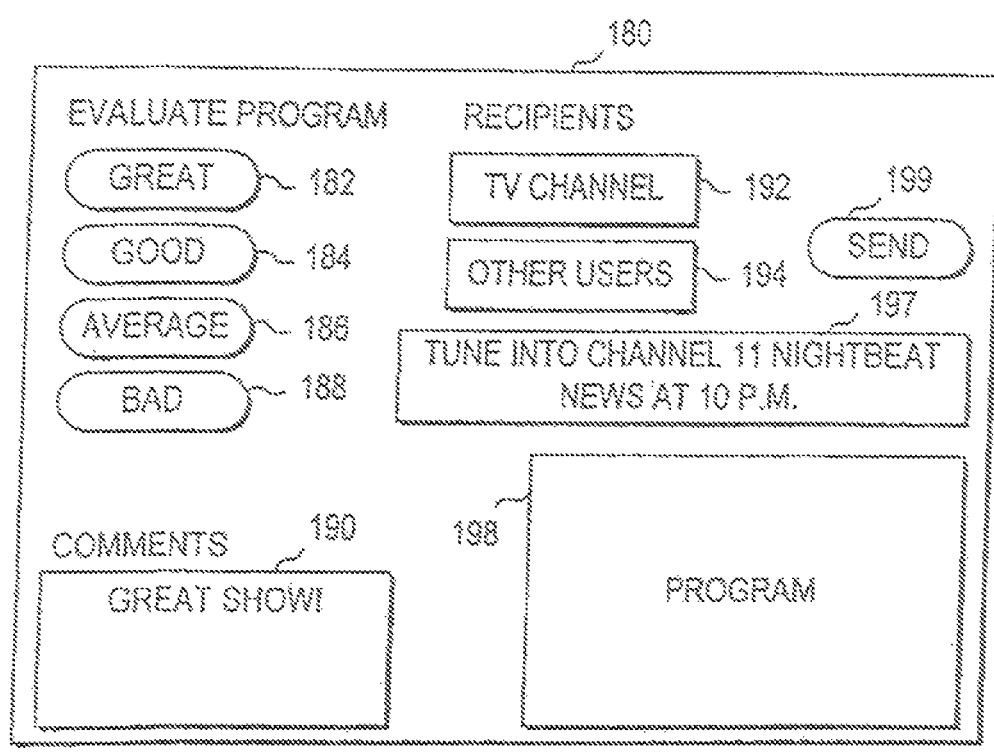
FIG. 7 is a depiction of an illustrative television message system display screen for providing a user with an opportunity to evaluate a television program in accordance with the present invention.

Referring now to FIG. 7, television display screen 180 allows a user of user television equipment to evaluate the television program that the user is viewing. The user can select one of options 182, 184, 186, and 188 to evaluate the program displayed in window 198. The television program is concurrently displayed in window 198 to assist the user in evaluating the program. Advertisement 197 may also be displayed on screen 180. The user can augment the evaluation by entering additional text comments in box 190 that may be distributed to recipients with the program evaluation. The user can select who the program evaluation will be sent to. The user can send the program evaluation to a television program entity such as the TV channel that broadcasts the television program (or an associated entity that compiles TV program data for the TV channel) by selecting option 192. An evaluation may include a simple score such as "good" or "bad," and it may include textual commentary.

The user can select option 194 to send the evaluation to other users of user television equipment as a recommendation to watch or not watch the particular program. The set-top box application will then display a user address book such as display screen 440 so the user can choose the desired recipients of the recommendation. The user may then select send option 199 to send the evaluation to the designated recipients. The set-top box application includes the identity of the TV program along with the evaluation or recommendation message. The television message system may then forward the evaluation to the destination addresses of the television program entity obtained from the program guide information or from data associated with the program. The television message system may transmit the recommendation to message equipment (e.g. server) for access by the recipient users of user television equipment. The communications paths in FIGS. 1A, 2A, 2B, and 3 illustrate the types of paths that may be used with these processes. Evaluations collected by this system from users may then be transmitted to the set-top box application and displayed in a variety of formats. For example, an interactive TV display screen may indicate that 370 of the viewers gave the program 4 stars, 46% gave it three stars, 10% gave it 2 stars, and 7% gave it 1 star.

Figure 8:
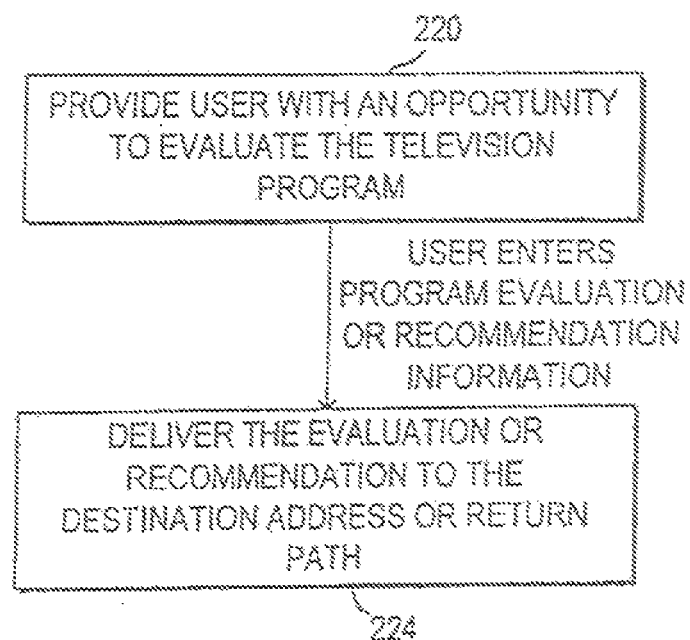
FIG. 8 is a flow chart showing steps involved in an illustrative approach for providing a user with an opportunity to evaluate a television program in accordance with the present invention.

An illustrative process for sending a television program evaluation or recommendation to a recipient is shown in FIG. 8. At step 220, the television messaging set-top box application functioning on the user television equipment provides the user with an opportunity to evaluate a television program. The set-top box application may provide an opportunity to evaluate a program by displaying an interactive television display screen such as display screen 180 in FIG. 7. If desired, the set-top box application may provide the user with an opportunity to evaluate a program by pressing buttons on his remote control. The user may then enter program evaluation or recommendation information for the television program following the options or instructions displayed on the user's television.

At step 224, the television message system delivers the evaluation or recommendation to the destination address or return path. If the address information is not known, the evaluation or recommendation may be transmitted to a return path which may be, for example, the user's television distribution facility. If the television distribution facility has sufficient information, the television distribution facility may forward the evaluation or recommendation to the appropriate destination.

The television messaging system of the present invention may also provide a fast and efficient way to gather ratings for television programs. A TV program rating is an estimate of the number of people who are watching a television program based on a survey of a selected group of people. In the television messaging system of the present invention, each set-top box connected to a given television distribution facility may send a message to the TV channel or an associated entity indicating whether the user is watching the current television program. A rating may be determined from this data if the sampling is taken from a large enough group. This system provides television channels and ratings services with a way in which to gather up-to-the-minute ratings on television programs from users who are currently watching the programs.

As shown in FIG. 9, television messaging display screen 230 may be used to provide the user with an opportunity to participate in a survey relating to television programming (e.g. a particular television program or a group of television programs). Television messaging system display screen 230 may provide a user with an opportunity to enter answers to questions 1 and 2 by selecting one or more of options 232*a-c* and 234*a-d* respectively. The set-top box application may obtain the survey questions and the return path from the program guide information transmitted from the main facility. Alternatively, some of this information may be encoded into the television messaging set-top box application. Advertisement 235 may be displayed on screen 230 with the survey questions.

If desired, the survey questions and return path (or destination address) may be encoded digitally in-band with the television program signal on a digital channel, provided in the VBI signal, or otherwise provided as data associated with the television program. The set-top box application functioning on the user television equipment may then decode the survey data from the program signal or other associated path, and indicate the availability of the survey option on a program listings menu in an interactive format so that the user may access the survey (see, e.g., FIG. 13).

The user may answer an additional set of survey questions by choosing option 236. The user can send the responses he has given to the survey questions by choosing option 238. The television message system will then deliver the survey answers as a survey message to the return path or destination address (e.g., a television program entity such as a television channel survey center) for processing. The user can cancel and return to a menu or to a television program by choosing cancel option 240. If desired, the television messaging set-top box application may provide the user with inducements for completing a survey, such as a chance to win a free month of programming or the like.

Figure 10:
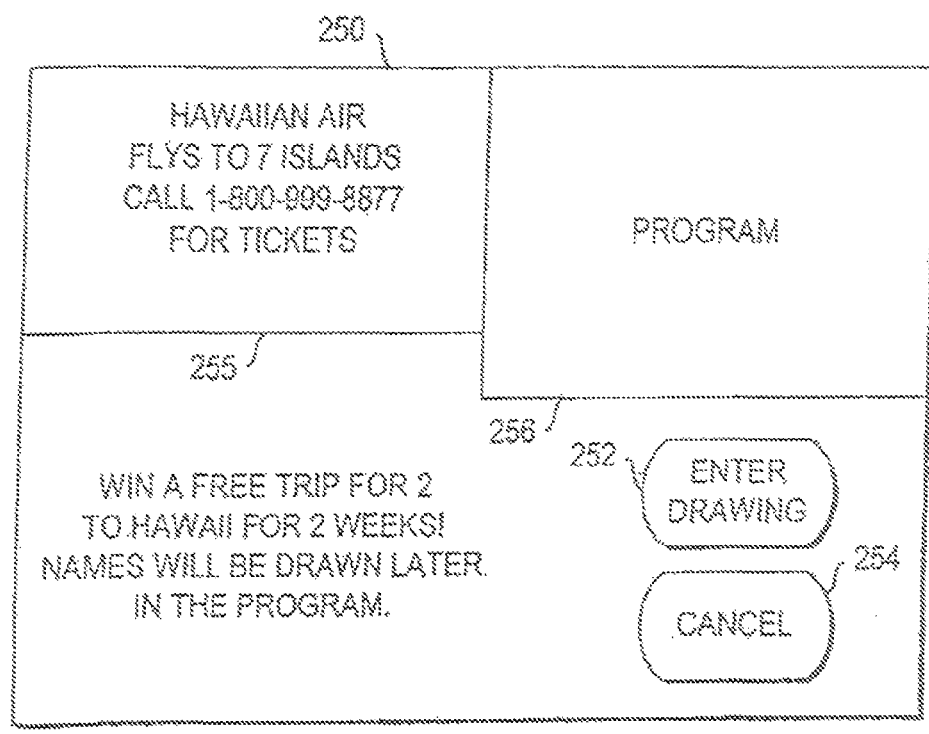
FIG. 10 is a depiction of an illustrative television display screen for providing the user with an opportunity to participate in a promotion related to a television program in accordance with the present invention.

As shown in FIG. 10, a television messaging system display screen 250 may provide the user with an opportunity to participate in a promotion related to television programming. The television channel that broadcasts a television program may be offering a promotional drawing as shown in FIG. 10. A reduced-sized image of the television program is displayed in window 256. An advertisement is displayed in region 255.

The user can enter the drawing by selecting option 252 or may decline by selecting option 254. If the user selects option 252, the television message system will forward a promotion message to the return path or destination address of the television program entity that is handling the promotion (e.g. the television channel or an associated facility) so that the user will be entered in the drawing. The promotion message may include the user's name and address.

The television message system will then deliver the message to a television program entity associated with the television channel that broadcasts program 256 for processing. The return path or destination address of a television program entity and the other promotion information displayed on screen 250 may be obtained using any suitable technique including encoding it digitally in-band with the television program signal on a digital channel, embedding it in the program signal VBI, otherwise providing it as data associated with the program, or downloading it to the set-top box 26 from a server or the main facility 16 (FIG. 1A). Television message display screen 250 may request that the user enter his name and address and demographic information such as the user's programming preferences if the user decides to enter the drawing. The television program entity can then send additional promotional information to the user based on the user's interests. The television program entity (e.g. the television channel) selects a winner from the pool of users who have entered the drawing. The winner may be announced at the end of the program. This promotion technique permits users of user television equipment devices to participate in promotions simply and easily without leaving their living rooms. A television program promotion will encourage users to watch the program and thereby increase ratings.

Figure 11:
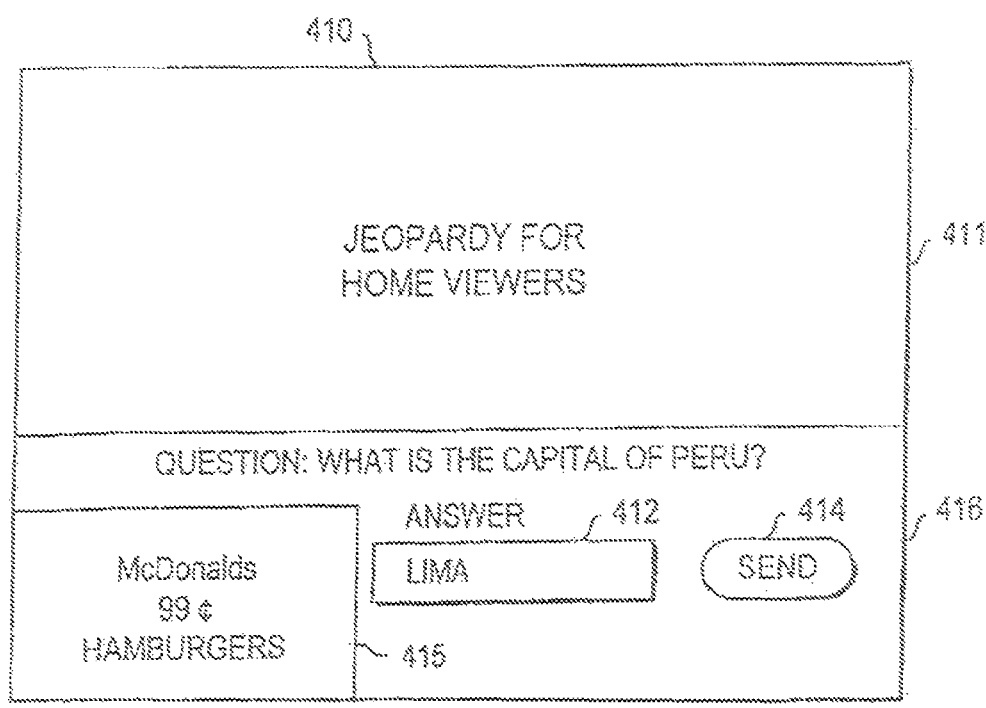
FIG. 11 is a depiction of an illustrative television message system display screen for providing the user with an opportunity to participate in a contest related to a television program in accordance with the present invention.

Referring now to FIG. 11, the television message system may provide a user of user television equipment with an opportunity to participate in a television program contest. The program "Jeopardy for Home Viewers" may be vertically compressed to fit in the upper half screen, may be truncated by overlaying instructions on its lower half, or may be displayed using any other suitable arrangement. In any case, at least a portion of the program is visible to the user in upper portion 411 of screen 410. A contest user interface 416 is simultaneously displayed in the lower portion of television display screen 410. This format allows a user to view a television program and participate in a contest at the same time. While a user is listening to questions being asked on the program "Jeopardy for Home Viewers," he can enter answers to the questions in box 412. The questions can also be displayed in the contest user interface 416 portion of screen 410. When the user is satisfied with his answer he can send it as a contest message to the return path or destination address by choosing option 414 or by pressing Enter on his remote control. The return path or destination address of the television program entity that receives the contest answers may be the television program broadcast facility that broadcasts the television program. An advertisement may be displayed in region 415.

The contest questions and other contest information (e.g., the return path) may be encoded digitally in-band with the television program signal on a digital channel, embedded in the VBI of the television program signal, or may be provided as other associated data or may be transmitted from a server to the set-top box over a separate channel. These arrangements allow contest information (such as contest questions) and the program signal to be continuously received by the set-top box during the course of a program. The contest information that appears on the interface screen 416 may be updated as it is received on the set-top box. Because the set-top box is receiving the television program signal for the TV program and the contest information concurrently, display screen 416 may be synchronized with the action occurring in the program as it unfolds. The winners of the contest can be determined immediately and may be announced during the course of the program. This aspect of the present invention allows television channels to implement interactive television programming for their users.

Figure 12:
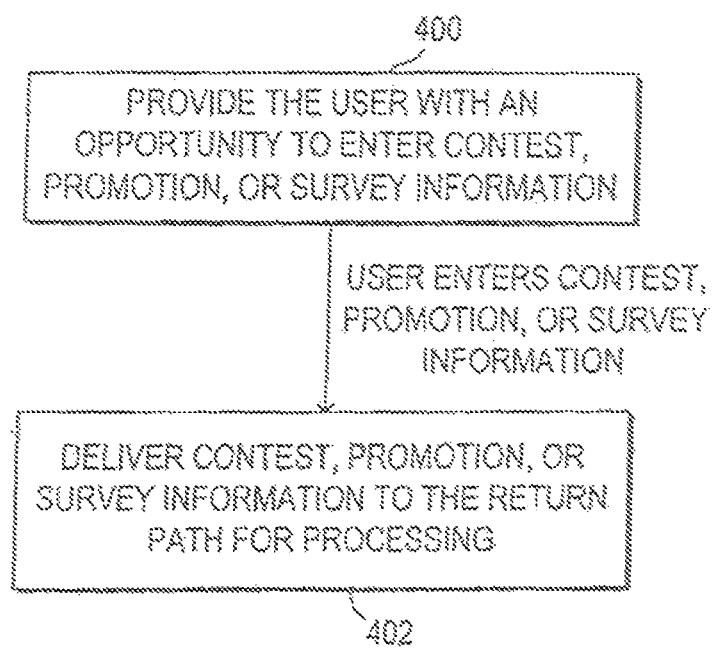
FIG. 12 is a flow chart showing steps involved in an illustrative approach for providing a user with an opportunity to participate in a television contest, promotion, or survey in accordance with the present invention.

An illustrative process for allowing a user to participate in a contest, promotion, or survey is shown in FIG. 12. At step 400, the set-top box application functioning on the user television equipment provides the user with an opportunity to enter survey, promotion, or contest information. This opportunity may be provided in the form of display screens such as display screens 230, 250, and 410 of FIGS. 9, 10, and 11, respectively. The user may enter appropriate survey, promotion, or contest information following the on-screen prompts provided in the display screens. At step 402, the television message system delivers the survey, promotion, or contest information to the return path or destination address for processing. If desired, step 402 may involve the step of using the television message system to transmit the message to the television distribution facility so that the message can be transmitted to the appropriate destination (e.g. a television program entity).

Figure 13:
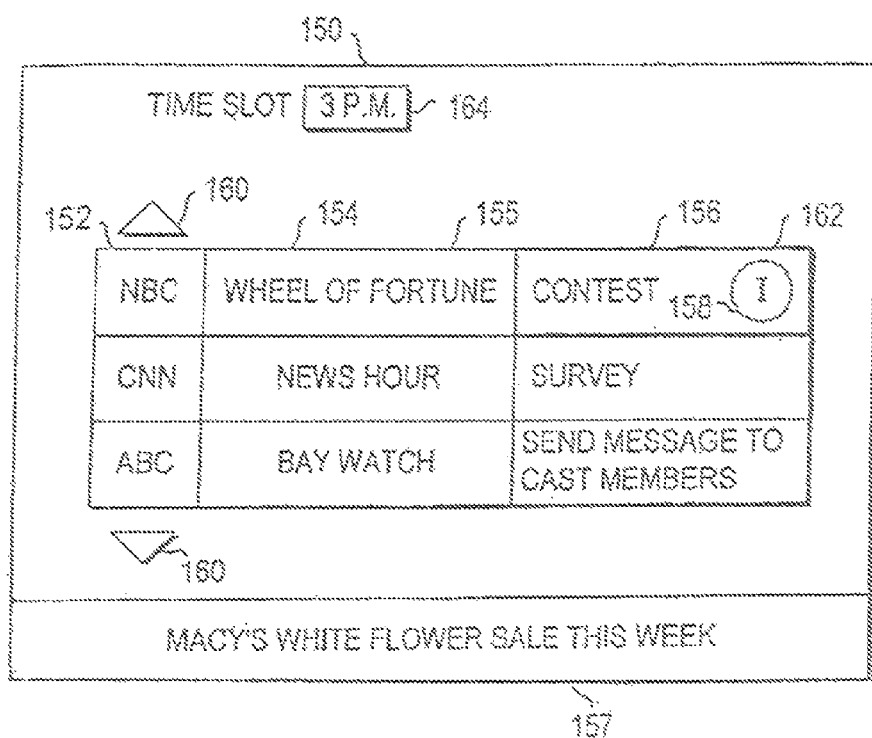
FIG. 13 is a depiction of an illustrative television display screen for displaying interactive features available for television programs in accordance with the present invention.

As shown in FIG. 13, program guide listings that are received by the set-top box from the program guide database at the main facility may indicate which television programs have interactive user message features available (e.g., a evaluation, contest, promotion, or survey feature). Television message system display screen 150 allows users to view which messaging features are available with respect to television programs that are being aired in a given time slot.

The user may enter a time slot in box 164 or otherwise select a time slot of interest. The set-top box application then displays program listings in column 154 for programs that are scheduled to be broadcast at the time indicated in box 164 on the channel in column 152. The messaging features available with respect to a given program are displayed by the set-top box application in column 156. For example, the program Wheel of Fortune is offering a contest which a user can participate in. The user can highlight contest option 162 and press enter on his remote control to enter the Wheel of Fortune contest. The I icon in circle 158 indicates that the channel has provided more information with respect to the Wheel of Fortune contest which the user may be interested in reading before entering the contest. The set-top box application may provide the user with an opportunity to review this information before the user is entered into the contest. Also, the user may simply view the program Wheel of Fortune by highlighting the Wheel of Fortune option 155 and pressing enter on the remote control. The user can scroll up or down to view the program listings and messaging features for more programs and channels as indicated by arrows 160. An advertisement may be displayed on screen 150 such as the one in region 157.

The features described with respect to FIG. 13 may be provided for in any format of listings. For example, the TV message system may provide a list of all of the message features for programs airing on a selected TV channel. The TV message system may also allow a user to search for programs by category or alphabetically, and list associated message features for each program. If desired, TV messaging features may be provided on a program information screen which allows a user to access multiple features related to the program, including the messaging features described in this application.

Figure 14:
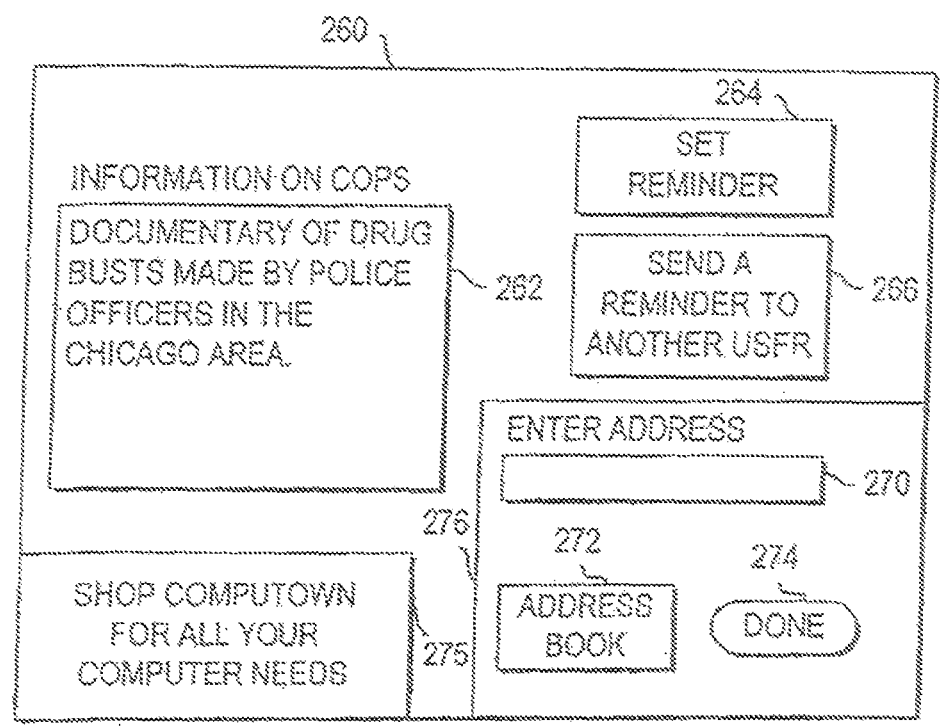
FIG. 14 is a depiction of an illustrative television message system display screen for providing a user with an opportunity to send a reminder message to another user in accordance with the present invention.

Another aspect of the present invention relates to the ability of the television message system to transmit reminder messages between users. Reminder messages are messages that are sent by one user to another user to remind the other user to watch a particular television program. Television message system display screen 260 of FIG. 14 is an example of a user interface that permits the user to send a reminder message to the set-top box of another user. A user may get to information screen 260 by selecting a program in the program guide listings and then pressing the "info" button on the remote control. The program guide listings contain information on programs that are currently airing on all available channels as well as programs that will be broadcast at future times. Information regarding the program selected in the listings is displayed in region 262 of information screen 260. The user can set a reminder for himself to watch the selected program by selecting option 264. The user can send a reminder to another user of a user television equipment device by selecting option 266. After the user selects option 266, pop-up region 276 appears in information screen 260. The user enters the recipient user's address information in region 270. The location address may include a unique code identifying the user and the message server from which the recipient user can receive messages. The user may also choose the recipient's identity from the address book by choosing option 272. More than one recipient may be entered. After the user has chosen a recipient, the user selects Done option 274. The reminder message is now transmitted to the recipient(s). An advertisement may also be displayed in region 275.

A reminder message may also be sent to a user of a user television equipment device from a web site that has program listings and that supports the transmittal of reminder messages such as www.tvguide.com. An Internet user may select a program from the listings displayed on the web site and enter the address of the recipient user. The web site transmits the reminder message to the recipient via a server.

Figure 15:
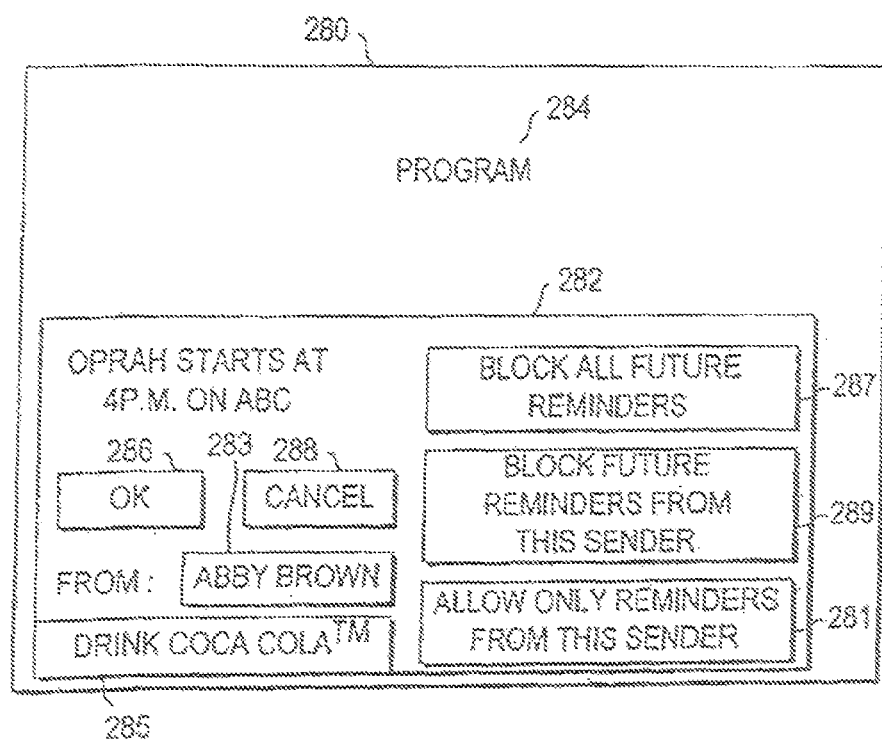
FIG. 15 is a depiction of an illustrative television message system display screen for displaying a reminder message received from another user in accordance with the present invention.

Referring now to FIG. 15, television display screen 280 shows how a reminder message that has been sent by one user and received on the set-top box of another user may be displayed. The recipient's set-top box application displays the reminder message a short time (e.g., 10 minutes) before the program that is related to the reminder is to air, regardless of the time that the set-top box receives the reminder message. If desired, the reminder message may be displayed at other times or more than once. For example, the reminder may be displayed when the user first turns on the television set within a twelve hour interval before the program airs. The set-top box application may also display the reminder the first time that the user turns on the television after the set-top box has received the reminder message. These methods help ensure that the user will see the reminder even if he is not watching television a short time before the program airs.

The illustrative reminder message 282 of FIG. 15 is displayed as a relatively small overlay on television display screen 280 so as to interrupt the user's viewing of program 284 as little as possible. The video of program 284 may instead be shrunk so that so that none of it is obscured by the reminder message. The reminder message 282 indicates to the user that the program "Oprah" will air on ABC at 4 p.m. The user can accept the reminder message by selecting OK option 286, in which case the set-top box application will tune to the channel that corresponds to the local ABC affiliate.

Reminder messages can also be sent across time zones or local broadcast areas. When a set-top box receives a reminder message, it will search through the program guide listings to determine when the program will be broadcast in the user's time zone or local area. The set-top box application then displays the reminder message on the television screen at an appropriate time before the program airs. The user may decline the reminder message by selecting cancel option 288 causing the message to disappear from the TV screen. The identity of the sender of the reminder message is displayed in region 283. If the set-top box application does not recognize the sender, then the sender's address or web site may be displayed in region 283. Displaying the sender's identity is useful for allowing the user to block that sender's reminders in the future. An advertisement may be displayed in region 285 of reminder 282 as shown in FIG. 15. If desired, multiple reminder messages may be displayed on a single overlay. The overlay may include both reminders set by the user, as well as, reminders sent by other users.

The television message system may provide the user with an opportunity to block all future reminder messages from a specific sender or all senders. When a reminder message is displayed to the user, it may include an option to block all future reminder messages from all senders such as option 287. The reminder message may also include an option such as option 289 which allows the user to block all future reminder messages from the user who has sent the current reminder. The reminder message may additionally include option 281 which configures the message system so that all reminder messages are blocked except reminders from the sender of the current reminder. These blocking features may be implemented to block other types of messages received on the set-top box. The filtering and blocking functions herein described may be performed at the set-top box of the recipient, at a remote server, or a the television distribution facility.

Figure 16:
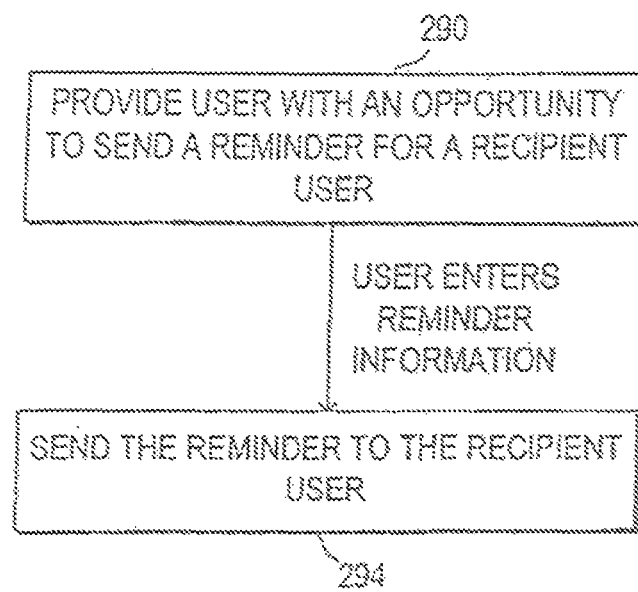
FIG. 16 is a flow chart showing steps involved in an illustrative approach for providing a user with an opportunity to create a reminder message to be sent to another user in accordance with the present invention.

An illustrative process for allowing a user of user television equipment to send a reminder to another user of user television equipment is shown in FIG. 16. At step 290, the set-top box application functioning on a user's television equipment provides the user with an opportunity to send a reminder message for a recipient user at a remote set-top box. The set-top box application can provide the user with an opportunity to send a reminder by using an interactive display screen such as television message system display screen 260 of FIG. 14. The user may enter reminder information such as the recipient user's address and the television program information. At step 294, the television message system may send the reminder to the recipient user's message server for subsequent downloading by the recipient user's user television equipment device.

Another aspect of the present invention relates to sending and receiving text, audio, or video messages between other users of user television equipment and users of communications equipment (e.g., Internet users, users of personal computers, etc.). The messages are similar to electronic mail (e-mail) in that they are stored on a message server and can be downloaded onto the recipient's set-top box by the set-top box application at any time. The user television equipment devices may communicate with the message server using any suitable network including the ones shown and described with respect to FIGS. 1A, 2A, 2B, and 3. Messages can be sent to a user's Internet service provider mail server for subsequent downloading by a user's computer. The television message system may also allow users to send program guide information such as TV program listings, program schedules, and program information as a message to other users.

Figure 17:
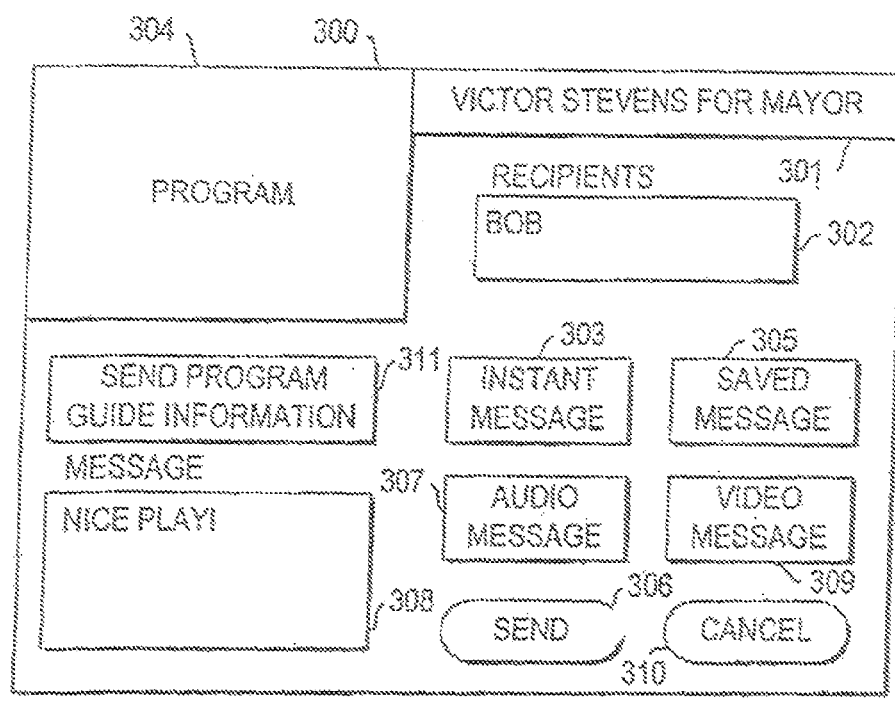
FIG. 17 is a depiction of an illustrative television message system display screen for providing a user with an opportunity to send a message to another user in accordance with the present invention.

As shown in FIG. 17, the set-top box application may provide a user of user television equipment with an opportunity to send a message to another user through a user interface such as television message system display screen 300. Television message system display screen 300 may be displayed by the set-top box application on the television when requested by the user (e.g., when the user presses a message button on his remote control). Television display screen 300 allows a user to compose a message and to send it to another user of user television equipment or a user of communications equipment.

The user can compose the text of the message in box 308 using a wireless keyboard such as the one shown in FIG. 1B. If desired, the user can compose a text message using a television screen keyboard such as the one shown in FIG. 1C or by choosing from a list of standard messages or words as shown, e.g., in FIG. 1D. The message sent by the user can relate to the television program that is displayed in window 304. For example, the message "Nice play!" relates to a television program such as football game that the user is watching in window 304. If desired, a user of user television equipment may send an audio message similar to a voice mail message using the set-top box application to another user by speaking into a microphone connected to the set-top box. A user may even send a picture or a video recording of himself (with or without the audio message) through the set-top box application using a camera that can communicate with the set-top box so that the recipient can watch a video recording of the sender on his television set.

The user may enter the recipient's name or address in box 302. In FIG. 17, the name Bob has been entered in box 302. The set-top box application will match the name Bob with an address previously entered by the user in the set-top box application address book. An e-mail address can also be entered in box 302 for Internet user recipients of a message. The user can designate the message as an instant message by selecting option 303 or a saved message by selecting option 305. An instant message is erased from memory at the recipient end after a short period of time, while a saved message is stored indefinitely in memory at the recipient end. The message in box 308 is only relevant for a short period of time during the course of the program. Therefore, the user may wish to designate it as an instant message.

The user may also send an audio message by selecting option 307 or a video message by selecting option 309. The user can compose an audio message by speaking into a microphone connected to the set-top box or by sending an audio clip from a program. The user can compose a video message using a video camera, a VCR, or by using video clips or video stills from a TV program. The video may be recorded using a local storage device (e.g. in the set-top box) or at a server. The user may also send video clips from a server-based library. The user may also send program guide information to another user as part or all of the message by selecting option 311. The program guide information may be a brief description of the program in window 304, a portion of the program guide listings, or a TV program or channel schedule. The user can send the message to the recipients by selecting send option 306. The user can cancel the message by selecting cancel option 310 and return to a set-top box application menu or a full screen view of the current television program. An advertisement may be displayed in region 301 of screen 300.

Figure 18:
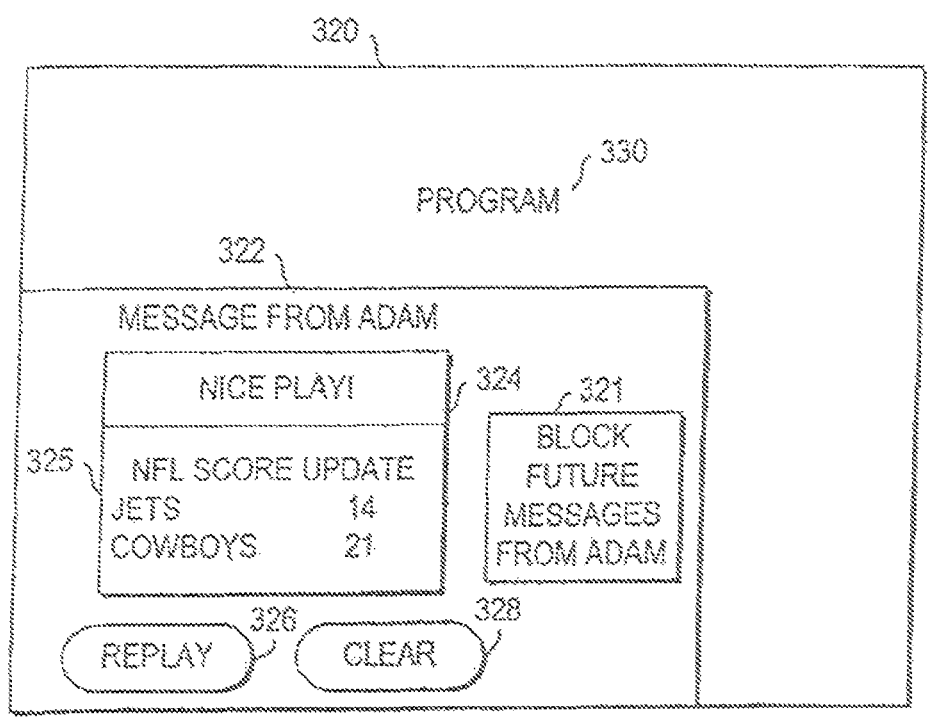
FIG. 18 is a depiction of an illustrative television message system display screen for displaying a message received by a user in accordance with the present invention.

As shown in FIG. 18, if the recipient of a message is a user of user television equipment, the recipient's set-top box application may display the message on the television screen some time after it is received by the set-top box. The set-top box application can periodically access all messages that are intended for the user from a message server and download them onto the set-top box. The message server can communicate with the user television equipment devices using any suitable configuration including the ones shown in FIGS. 1A, 2A, 2B, and 3.

Television display screen 320 is an example of how the message can be displayed. The message may be received by the user's set-top box 26 and stored in memory 25 (FIG. 1A). The set-top box application may then display the message on the user's television screen (i.e., on television 30 of FIG. 1) preferably in a way that interrupts the user's viewing of program 330 as little as possible. The message should, however, be large enough so that the user may read it. In FIG. 18, the set-top box application displays message 324 in window 322 in the lower left corner of display screen 320 while the user is watching television program 330.

If desired, the set-top box application may display an icon such as a small mailbox in the corner of the television screen or turn on a light on the front panel of the set-top box to indicate to the user that a message from another user has been received. The user may then access the content of the message by pressing a designated button on the remote control. The message may be displayed in a corner of the screen as shown in FIG. 18 or in a full screen view.

Window 322 displays the content of the message 324, and the sender of the message. If the set-top box application does not recognize the sender or the sender's name is not provided as part of the message, the set-top box application may display the sender's path or address instead. Message 324 may contain an advertisement or other information that the set-top box application or message server appends to it. In FIG. 18, the current score of the NFL game is attached to message 324 in region 325. Message 324 may also contain a title which may be entered by the sender or an additional advertisement. Window 322 provides the user with an opportunity to reply to the message by choosing reply option 326 or to clear the message from the screen by choosing clear option 328. If the user chooses to reply to the message, the set-top box application can take the user to an interactive screen such as screen 300 of FIG. 17, so the user can compose a reply message. The user may block future messages received from the sender by selecting option 321. The sender's address is then stored locally or at the message server so that future messages from this address are filtered out.

Figure 19:
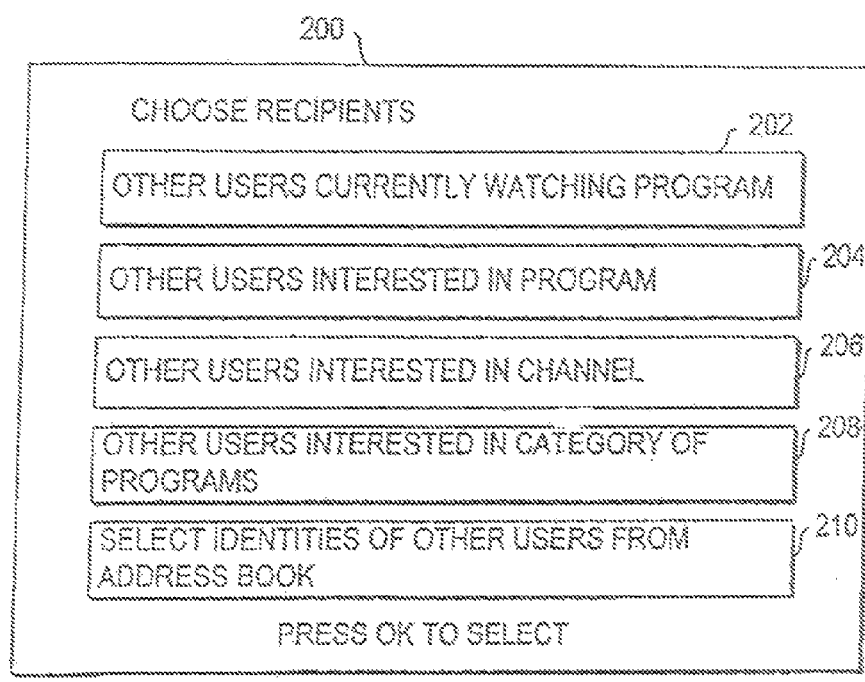
FIG. 19 is a depiction of a television message system display screen for providing a user with an opportunity to send a message to other users based on television program-related criteria in accordance with the present invention.

As shown in FIG. 19, the television message system may allow a user of user television equipment to transmit a message to another user of user television equipment who is chosen based on television-program-related criteria. The set-top box application may provide the user with an opportunity to select the program-related criteria to use in sending messages to the recipients using a user interface such as television message system display screen 200. The criteria may be other users of user television equipment who are currently watching a particular television program (e.g., the current television program) (option 202), other users who are interested in a particular program (e.g., the current television program) (option 204), other users who are interested in the same channel (e.g., the same channel as that on which the current television program is being broadcast) (option 206), or other users who are interested in the same category of programs (e.g., the same category as the current program) (option 208). The set-top box application may determine the current program by accessing the database of program listings information stored in memory 25 or on a remote server. The set-top box application may also determine the current program by accessing a database (e.g., a program listings database stored locally on the set-top box or on a server) and using information on the current time (e.g. which the set-top box or server has access to using a clock), and the current channel (known from the state of the tuner in set-top box 26).

The recipients of the message may be selected in a variety of ways. For example, the set-top box application may allow the user to view the names of other users in the address book and to filter out only those other users who have an interest in the same program, channel, etc. by selecting option 210. The message would only be sent to the other users with appropriate interests (as determined by the user). If desired, user addresses may be provided with information identifying their interests. The set-top box application may then automatically search for users in the address book who have interests that match the current program, current channel, or category of the current program (options 204, 206, and 208). Users interested in a category of programs may be identified in a group stored in the address book such as "Movie Lovers" or "Monday Night Football Fans," as shown in FIG. 6C. These address book groups may be selected via option 208. Users interested in a particular program may be identified in a group stored in the address book such as "Seinfeld Fans," as shown in FIG. 6C. These groups may be selected using option 204. If desired, a message may be sent to particular people, entities, or groups that the user individually chooses from his address book without regard to their interests with option 210. In any case, the television message system may transmit messages to a message server until it is accessed by the recipient.

If desired, the television message system can deliver a message related to a given program to a particular message server with an indication that the message is intended for receipt by current viewers of the given program, users interested in the program, users interested in the channel of the program, or users interested in the category of the program. The message server may group the message with other messages relating to the given program, channel, or category. The message server then may allow any user's set-top box application to access all the messages for the programs, channels, or categories that the user at that set-top box is interested in or is currently viewing. Any other users who wish to access messages relating to a program, channel, or category of programs can download those messages from the message server onto their set-top boxes so that they can be read on a television set.

A user can indicate to his set-top box application that he wishes to access messages relating to a program he is currently watching by, for example, pressing a message button on his remote control. In a program guide, a user can access messages relating to any program he is interested in by highlighting a program listing for that program in a program guide and pressing the message button on his remote control or by choosing a program guide menu option. The set-top box application may provide the user with an opportunity to access messages relating to specific channels, or categories of programs in a similar fashion. Messages may be download from the message server by the set-top box application onto the set-top box for viewing by the user. The set-top box application may display the messages in a list format by sender, topic of message, etc. The user may then choose the messages he wants to read from the list.

Figure 20:
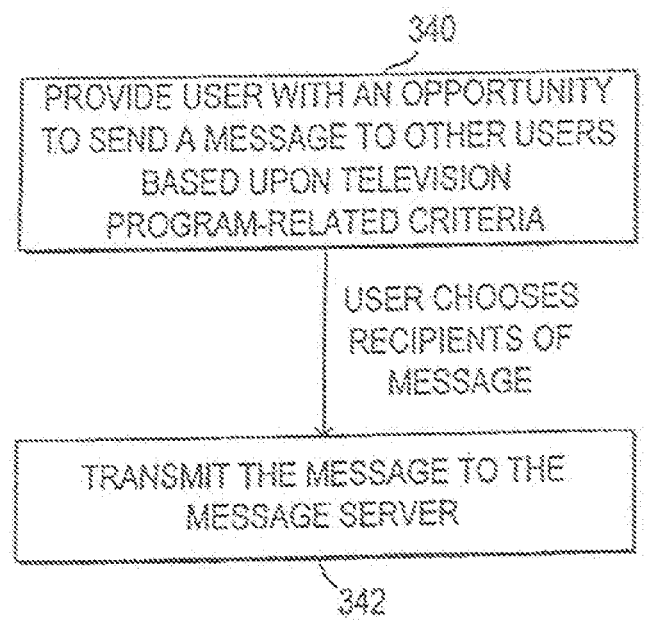
FIG. 20 is a flow chart showing steps involved in an illustrative approach for providing a user with an opportunity send a message to other users based upon television program-related criteria in accordance with the present invention.

An illustrative process for transmitting a message composed by a user of user television equipment to other users of user television equipment that were selected based upon television program-related criteria is shown in FIG. 20. At step 340, the television messaging set-top box application functioning on the user television equipment provides the user with an opportunity to send a message to other users based upon television-program-related criteria. The set-top box application may provide this opportunity by displaying a user interface such as television message system display screen 200. The message to be sent may be, for example, a recommendation to watch a program. The message may be entered into the set-top box application using, for example, display screen 180 in FIG. 7. If desired, the message may relate to the context of a program entered using, for example, television message system display screen 300 of FIG. 17. The user may choose recipients for a message from the options provided by, for example, television message system display screen 200 of FIG. 19. At step 342, the television message system transmits the message to a message server for access by the recipient users.

Figure 21:
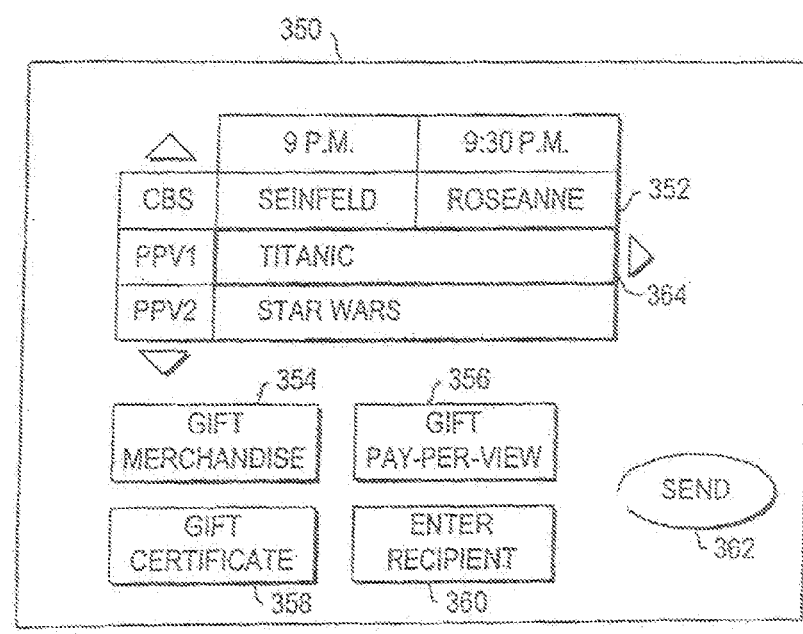
FIG. 21 is a depiction of an illustrative television message system display screen for providing a user with an opportunity to purchase a television program-related gift for another user in accordance with the present invention.

The set-top box application may provide the user with an opportunity to send a gift to another user of user television equipment or a user of communications equipment (e.g., an Internet user). As shown in FIG. 21, a television message system display screen 350 may be used to allow the users to scroll through television program listings 352 to find a particular television program. The program listings may be organized by broadcast time and by channel. The program guide listings may include pay-per-view channels such as PPV1 and PPV2. The user may be provided with an option to purchase a pay-per-view program such as "Titanic" on channel PPV1. Option 364 is highlighted to indicate that the user has selected "Titanic."

Television message system display screen 350 may display the gift options that are available for a particular program that the user has selected from the program listings. Information regarding which gift options are available for a particular channel or program may be part of the program guide information that the set-top box receives from the main facility, encoded digitally in-band with the television program signal on a digital channel, provided in the VBI signal, or otherwise provided as data associated with the television program. If gift options are available for "Titanic," the set-top box application will display the gift options such as gift options 354, 356, and 358 that are available for the program that the user has chosen. Gift option 354 allows the user to purchase program merchandise for another user. Gift option 356 allows the user to purchase a pay-per-view program for another user to watch, such as "Titanic" on PPV1. Gift option 358 allows the user to purchase a gift certificate for program merchandise, a pay-per-view program viewing coupon, etc. The user may enter the identity of the recipient of the gift by choosing option 360. Gift information relating to a TV program may also be provided for a specific program on a program information screen that a user can access by highlighting the program in the listings grid and then pressing an "info" button on the remote control.

A gift may be processed when the user selects send option 362. Gift information may be sent to a television distribution facility or a television program entity for processing. The user's account at the television distribution facility may be debited for the cost of the gift or another suitable accounting mechanism may be used. The recipient of a gift may be notified of the gift by a message received on the recipient's set-top box or e-mail to an Internet user. Gift merchandise may be shipped to the recipient. If the gift is a pay-per-view program, the recipient's pay-per-view account may be credited by the amount of the gift or gift certificate. If the recipient is not a user of user television equipment (e.g., the recipient is an Internet user), the recipient may be notified of the gift and given an access code that allows the recipient to view free pay-per-view programs on his television up to the amount of the gift. If the recipient is a subscriber to the services of the same television distribution facility 16 as the gift giver, the access code may be provided by that television distribution facility and may be released by the same television distribution facility.

If desired, television distribution facilities may be networked together so that a gift giver and recipient may be subscribers in different television distribution facilities. The TV message system may also authorize a specified gift PPV program automatically for the recipient without requiring an access code. In another embodiment, the local program guide that receives the PPV gift may allow the recipient of the gift to access the PPV program without charging the recipient and without requiring an access code.

Figure 22:
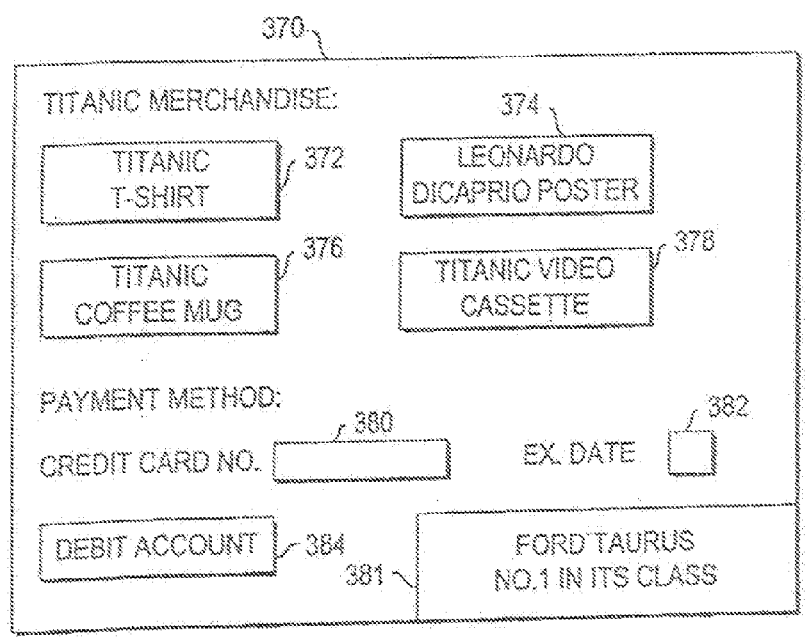
FIG. 22 is a depiction of an illustrative television message system display screen for providing a user with an opportunity to purchase program-related merchandise in accordance with the present invention.

Referring now to FIG. 22, television message system display screen 370 is an example of a user interface that allows a user to purchase program-related merchandise. The set-top box application may display screen 370 when the user selects a gift option such as gift option 354 of screen 350 (FIG. 21). Screen 370 provides the user with an opportunity to select program-related merchandise that he wishes to purchase as a gift for another user. The merchandise options 372, 374, 376, and 378 represent items of merchandise related to the program "Titanic" which the user can purchase. If the user wishes to pay by credit card, the user may enter his credit card number and its expiration date in boxes 380 and 382 respectively. If the user wishes to have his account at the television distribution facility debited, he may select payment option 384. An advertisement may be displayed in region 381 of screen 370.

Figure 23:
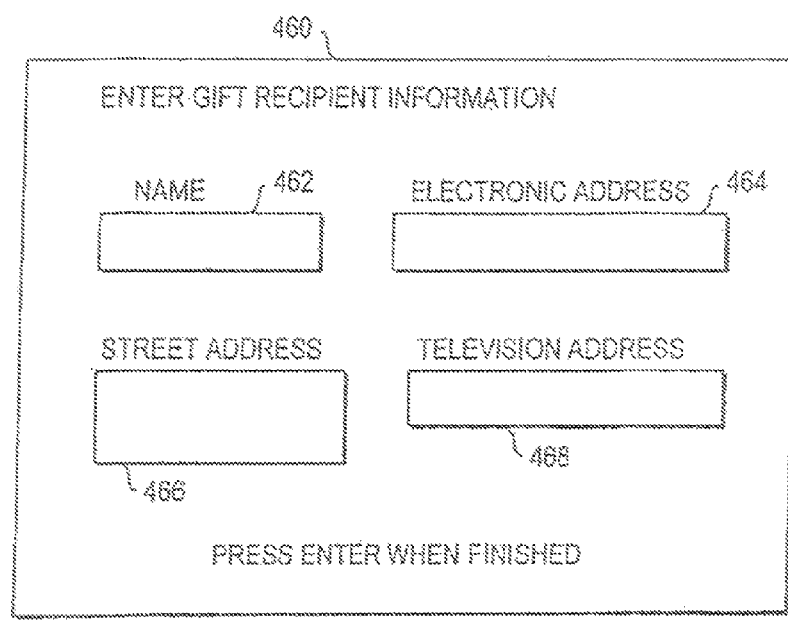
FIG. 23 is a depiction of an illustrative television message system display screen for providing a user with an opportunity to enter gift recipient identity and address information in accordance with the present invention.

Referring now to FIG. 23, television message system display screen 460 is an example of a user interface that allows a user to enter gift recipient identity and address information. The set-top box application may display screen 460 when the user selects an option such as the "enter recipient" option 360 of screen 350 (FIG. 21). Screen 460 provides the user with an opportunity to enter information about the gift recipient so that the recipient may be notified that the gift has been purchased, and so that the recipient may receive the gift. The user may enter the gift recipient's name in region 462. The user may enter the gift recipient's electronic address (e.g. e-mail address) in region 464 if the recipient has an electronic address. The user may enter the recipient's street address (e.g. home address or mailing address) in region 466 if the gift is a tangible item such as program merchandise that is to be physically sent to the recipient. The user may enter the gift recipient's television address in region 468. The television address may be the address corresponding the gift recipient's user television equipment device which has messaging features. A notification that a gift has been purchased may be sent to the electronic address, the street address, or the television address. If desired, the television address may correspond to the gift recipient's television distribution facility so that the gift recipient may be credited for a pay-per-view program gift or gift certificate that has been purchased by the user.

Figure 24:
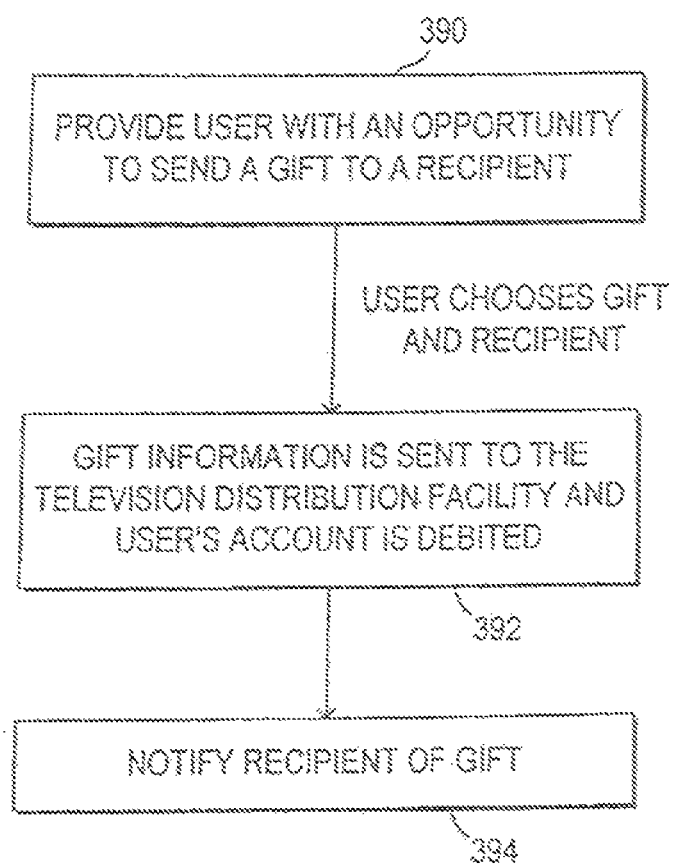
FIG. 24 is a flow chart showing steps involved in an illustrative approach for providing a user with an opportunity to purchase a gift through the television message system in accordance with the present invention.

An illustrative process for allowing a user of user television equipment to purchase a gift through the television message system is shown in FIG. 24. At step 390, the set-top box application provides the user with an opportunity to send a gift to a recipient. The set-top box application can provide this opportunity through a user interface such as display screen 350 of FIG. 21. The gift can be related to television programming such as program-related merchandise or a pay-per-view program.

After the user selects the gift and the recipient of the gift, the television message system transmits the gift information to the television distribution facility (or a remote server or a television program entity for e.g. the purchase of program merchandise) at step 392 where the user's account is debited. The user's account can be a pay-per-view account or other account maintained with the television distribution facility, an account maintained with a television channel, an account maintained at a third party institution (such as a bank), a credit card account such as a Visa account, or any other suitable account. At step 394, the recipient may be notified that a gift has been purchased for him. The recipient may be notified by the shipper of the merchandise, or by the television distribution facility that handles pay-per-view programming for that recipient. The recipient may be notified by an electronic message that is sent to the message server where messages for the recipient are maintained.

Figure 25:
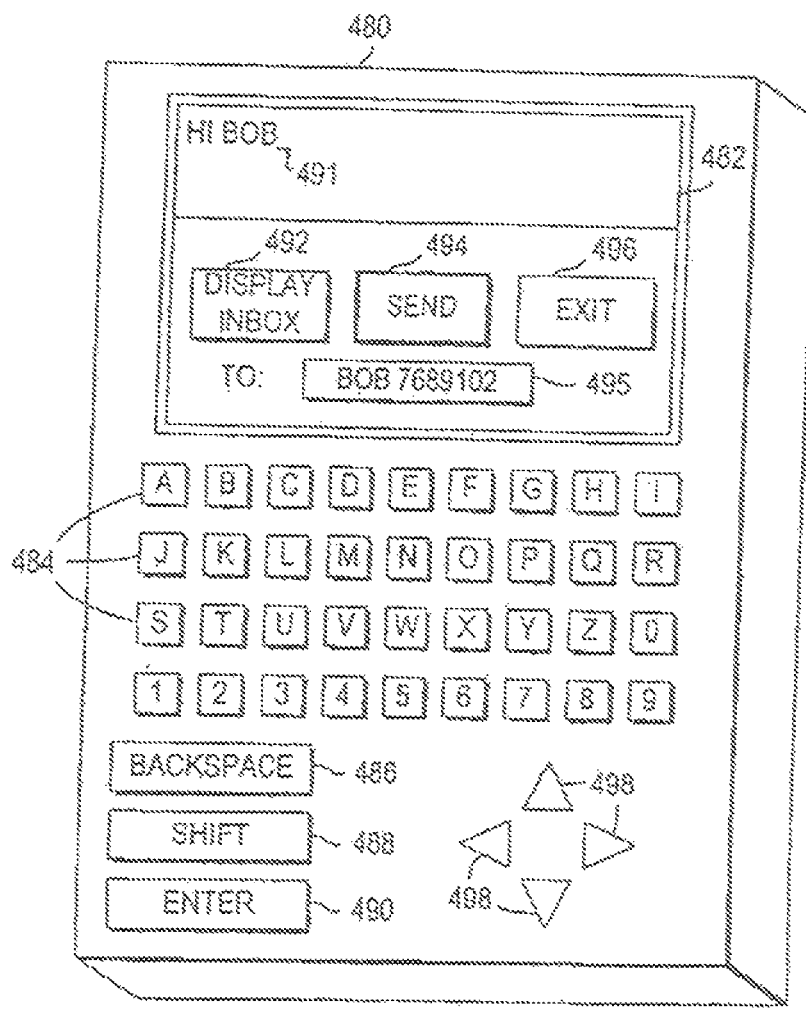
FIG. 25 is a depiction of a display remote control with television messaging features in accordance with the present invention.

Many of the features of the present invention may be used with a two-way interactive display remote control. An example of a display remote control is shown in FIG. 25. Display remote control 480 contains display screen 482 which may be any suitable type of display screen. A user may compose a message to another user using buttons 484. Pressing any of buttons 484 causes the selected letter or number to appear adjacent to cursor 491. The user may delete a letter or number by pressing Backspace button 486, and may enter upper case letters by pressing Shift button 488. The user may enter the recipient's address in region 495 of display screen 482, and may send the message by selecting Send option 494. The user may navigate between selected regions of display screen 482 using arrow buttons 498. For example, Send option 494 is highlighted in FIG. 25. Therefore, if the user press Enter button 490, the message will be sent to the recipient. Pressing the down arrow causes address region 495 to become active so that pressing buttons 484 causes letters or numerals to be entered in region 495.

The user may also view messages that have been sent to him by others users by selecting option 492. Option 492 opens up the user's inbox so that the user can read incoming messages directly on display screen 482. These features give the user additional privacy when composing messages and reading incoming messages. The display remote control therefore is a two-way interactive remote in that messages may be composed and sent, as well as received and read by the user. Further features of an illustrative display remote control are described in Herrington et al. U.S. provisional patent application Ser. No. 60/138,868, filed Jun. 11, 1999, which is hereby incorporated by reference herein in its entirety. A display remote may also be used for chatting between users. Further features of an illustrative television chat system are described in DeWeese et al. U.S. patent application Ser. No. 09/356,270, filed Jul. 16, 1999, which is hereby incorporated by reference herein in its entirety.

The foregoing is merely illustrative of the principles of this invention and various modifications can be made by those skilled in the art without departing from the scope and spirit of the invention.

What is claimed is:

1. A method for allowing a user to purchase media programs as gifts, the method comprising:
  receiving, from a first user equipment device at a first location, a user selection of a media program to purchase for a recipient at a second user equipment device at a second location, wherein the selected media program has an associated access restriction;
  receiving, from the first user equipment device, information for purchasing the selected media program for the recipient; and
  in response to receiving the information transmission, automatically authorizing the second user equipment device to access the selected media program, wherein the second user equipment device retrieves the media program from a server based on the authorization.

2. The method of claim 1, wherein the second user equipment device accesses the selected media program after the authorization.

3. The method of claim 1, wherein the second user equipment device is automatically authorized without requiring that an asset-specific access code is received from the second user equipment device.

4. The method of claim 1, wherein the recipient at the second user equipment device is notified that the selected program has been purchased.

5. The method of claim 1, further comprising the first user equipment device transmitting a message related to the program purchased from the first user equipment device to the second user equipment device.

6. The method of claim 5, wherein the message transmitted to the recipient is an e-mail notifying the recipient that the gift has been purchased.

7. The method of claim 1, wherein the second user equipment device is provided with access to the program without charging the recipient for the program.

8. The method of claim 1, wherein the received information for purchasing the program comprises at least one of the identity of the recipient and an e-mail address of the recipient.

9. The method of claim 1, wherein the received information provided for purchasing the program comprises payment information.

10. A system for allowing a user to purchase media programs as gifts, the system comprising processing circuitry configured to:
   receive, from a first user equipment device at a first location, a user selection of a media program to purchase for a recipient at a second user equipment device at a second location, wherein the selected media program has an associated access restriction;
   receive, from the first user equipment device, information from the user for purchasing the selected media program for the recipient; and
   in response to receiving the information transmission, automatically authorize the second user equipment device to access the selected media program, wherein the second user equipment device retrieves the media program from a server based on the authorization.

11. The system of claim 10, wherein the second user equipment device is configured to access the selected media program after the authorization.

12. A system of claim 10, wherein the processing circuitry is configured to automatically authorize the second user equipment device without requiring an asset-specific access code.

13. The system of claim 10, wherein the processing circuitry is further configured to notify the recipient on the second user equipment device at the second location that the selected program has been purchased.

14. The system of claim 10, wherein the first user equipment device is configured to transmit a message relating to the program purchased from the first user equipment device to the second user equipment device.

15. The system of claim 14, wherein the message transmitted to the recipient is an e-mail notifying the recipient that the gift has been purchased.

16. The system of claim 10, wherein the processing circuitry is further configured to provide the second user equipment device with access to the program without charging the recipient for the program.

17. The system of claim 10, wherein the received information for purchasing the program comprises at least one of the identity of the recipient and an e-mail address of the recipient.

18. The system of claim 10, wherein the received information for purchasing the program comprises payment information.

19. A method for allowing a user to purchase media programs as gifts, the method comprising:
   receiving, at a first user equipment device at a first location, a user selection of a media program to purchase for a recipient at a second user equipment device at a second location, wherein the selected media program has an associated access restriction;
   receiving, at the first user equipment device, information for purchasing the selected media program for the recipient; and
   transmitting the received information to a distribution facility through a communication path, wherein, in response to receiving the information transmission, the distribution facility automatically authorizes the second user equipment device to access the selected media program, wherein the second user equipment device retrieves the media program from a server based on the authorization.

20. A system for allowing a user to purchase media programs as gifts, the system comprising processing circuitry configured to:
   receive, at a first user equipment device at a first location, a user selection of a media program to purchase for a recipient at a second user equipment device at a second location, wherein the selected media program has an associated access restriction;
   receive, at the first user equipment device, information from the user for purchasing the selected media program for the recipient; and
   transmit the received information to a distribution facility through a communication path, wherein, in response to receiving the information transmission, the distribution facility automatically authorizes the second user equipment device to access the selected media program, wherein the second user equipment device retrieves the media program from a server based on the authorization.

* * * * *